(12) United States Patent
Hadar

(10) Patent No.: US 11,074,682 B2
(45) Date of Patent: Jul. 27, 2021

(54) SYSTEM AND METHOD FOR AUTOMATED FOOD SAFETY ANALYSIS, QUALITY ANALYSIS AND GRADING OF GRAINS

(71) Applicant: Vibe Imaging Analytics Ltd., Bnei-Brak (IL)

(72) Inventor: Ron Hadar, Capitola, CA (US)

(73) Assignee: Vibe Imaging Analytics, Bnei-Brak (IL)

( * ) Notice: Subject to any disclaimer, the term of this patent is extended or adjusted under 35 U.S.C. 154(b) by 0 days.

(21) Appl. No.: 16/434,497

(22) Filed: Jun. 7, 2019

(65) Prior Publication Data

US 2020/0027204 A1    Jan. 23, 2020

Related U.S. Application Data

(63) Continuation-in-part of application No. 16/122,853, filed on Sep. 5, 2018, now Pat. No. 10,740,893.

(60) Provisional application No. 62/605,957, filed on Sep. 5, 2017, provisional application No. 62/606,332, filed on Sep. 19, 2017.

(51) Int. Cl.

| | | |
|---|---|---|
| G06T 7/00 | (2017.01) | |
| G06Q 30/00 | (2012.01) | |
| A01D 45/30 | (2006.01) | |
| A01D 75/02 | (2006.01) | |
| G06T 7/62 | (2017.01) | |
| H04W 4/029 | (2018.01) | |
| A01D 41/127 | (2006.01) | |

(52) U.S. Cl.
CPC ............ *G06T 7/001* (2013.01); *A01D 45/30* (2013.01); *A01D 75/02* (2013.01); *G06Q 30/018* (2013.01); *G06T 7/0004* (2013.01); *G06T 7/62* (2017.01); *H04W 4/029* (2018.02); *A01D 41/127* (2013.01); *A01D 41/1277* (2013.01); *G06T 2207/10024* (2013.01); *G06T 2207/30128* (2013.01); *G06T 2207/30242* (2013.01)

(58) Field of Classification Search
None
See application file for complete search history.

(56) References Cited

FOREIGN PATENT DOCUMENTS

JP        07-96205 A    *    4/1995

OTHER PUBLICATIONS

Jain, Kavindra R., Chintan K. Modi, and Jalpa J. Patel. "Non-destructive quality evaluation in spice industry with specific reference to *Cuminum cyminum* L (cumin) seeds." 2009 Second International Conference on Emerging Trends in Engineering & Technology. IEEE, 2009. (Year: 2009).*
Wan, Y-N., C-M. Lin, and J-F. Chiou. "Rice quality classification using an automatic grain quality inspection system." Transactions of the ASAE 45.2 (2002): 379. (Year: 2002).*

* cited by examiner

*Primary Examiner* — Vu Le
*Assistant Examiner* — Tracy Mangialaschi
(74) *Attorney, Agent, or Firm* — Brian R. Galvin; Galvin Patent Law LLC

(57) ABSTRACT

A system and method for automated grain inspection and analysis of results, that inspects grains using a plurality of light spectra, analyzes the results, and produces detailed reports from the analysis.

6 Claims, 26 Drawing Sheets

Certificate of Analysis 2300

Customer:

| | | | |
|---|---|---|---|
| Ron Hadar | BOL#: | Vehicle: | Net Wt: |
| 1234 1st St | 3013333 | 4LF7646-47 | 52,998 lbs |
| Santa Rosa, CA | Truck 2 | 4LF7646-47 | 52,998 lbs |
| Ste. 1A | Truck 3 | 4LF7646-47 | 52,998 lbs |
| Attn. Shipping | Truck 4 | 4LF7646-47 | 52,998 lbs |

Common Name: Second Heads Rice
BOL Date: 08/14/2017
Load Date: 08/14/2017
PO #: 25460 28502
BOL #: For Single or 5th Truck
Lot #: 005

Quality Factors:

| | |
|---|---|
| Moisture %: 0.00 | Second Heads %: 0.00 |
| Damaged %: 0.00 | Brewers Rice %: 0.00 |
| Chalky %: 2.29 | Heat-Damaged %: 0.00 |
| Other %: 0.00 | Total Seeds %: 0.00 |
| Objects %: 0.00 | Milling: Well-milled |
| Broken %: 1.57 | Temp: 67.40 |
| Head Rice %: 0.00 | Year: 2017 |

Quality Statement:

This lot of rice meets or exceeds the standards for U.S. #1 Second Heads Rice.

Fig. 23

SYSTEM AND METHOD FOR AUTOMATED FOOD SAFETY ANALYSIS, QUALITY ANALYSIS AND GRADING OF GRAINS

CROSS-REFERENCE TO RELATED APPLICATIONS

| Application No. | Date Filed | Title |
|---|---|---|
| Current application | Herewith | SYSTEM AND METHOD FOR AUTOMATED FOOD SAFETY ANALYSIS, QUALITY ANALYSIS AND GRADING OF GRAINS Is a continuation-in-part of: |
| 16/122,853 | Sep. 5, 2018 | SYSTEM AND METHOD FOR AUTOMATED GRAIN INSPECTION AND ANALYSIS OF RESULTS which claims benefit of and priority to: |
| 62/606,332 | Sep. 19, 2017 | System, methods and applications for food safety, quality, process control and commercial grading and also claims benefit of, and priority to: |
| 62/605,957 | Sep. 5, 2017 | System and method for automate grain inspection and analysis of results | the entire specification of each of which is incorporated herein by reference.

BACKGROUND

Field of the Art

The disclosure relates to the field of image analysis, and more particularly to the field of using image analysis to automatically inspect and analyze grains (seeds and pulses).

Discussion of the State of the Art

Grains inspections and related applications for quality control, process control, food safety and grading for commercial value are based on subjective measures, use human interpretation of the inspected objects with pictures provided and descriptive specifications provided by the standards bodies.

Inspection of various grains (for example, various plant grains such as wheat or rice, mineral or metallic grains, or granulated or powdered substances) for various purposes such as safety or marketability is generally limited by factors such as subjectivity and speed, due to reliance on manual inspection methods. These methods also do not scale well and thus inspection is restricted to a sample group that is assumed to be an accurate representation of the entire lot, and study has shown visual inspection to have an error rate of 20-30%.

What is needed is a system and method that assesses food safety, quality, and commercial grading, and allows for automated process control, based on automated, quantifiable, repeatable results, and not based on subjective human evaluation and interpretation.

SUMMARY

Accordingly, the inventor has conceived and reduced to practice, a system and method for automated grain inspection using image processing algorithms using a plurality of light spectra, which provides automated food safety, quality, and commercial grading reports and certificates, and also allows for automated process control.

According to a preferred embodiment, a system for automated food safety analysis, quality analysis, and grading of grains, comprising: an image processor, comprising at least a plurality of programming instructions stored in the memory of, and operating on at least one processor of, a computing device, wherein the plurality of programming instructions, when operating on the processor, cause the computing device to: receive a digital image of grains; identify and count within the image the areas associated with individual grains; extract dimension information for each individual grain identified; create, for each individual grain identified, a pixel map of the color data for each pixel within the area of the image associated with that individual grain; and transmit or store the data comprising individual grain count, dimension information, and pixel map for each individual grain for analysis; and a food safety analyzer, comprising at least a plurality of programming instructions stored in the memory of, and operating on at least one processor of, a computing device, wherein the plurality of programming instructions, when operating on the processor, cause the computing device to: receive or obtain data from the image processor for a sufficient number of images from a single lot of grain to constitute a statistically representative sample for the lot of grain; compare each pixel map in the data against pixel maps from reference images of infected grains of the type being inspected; perform a food safety analysis, based on the pixel map comparisons, comprising at least the type and extent of infection for each individual grain and the percentage of infected grains in the data for the statistically representative sample; and compare the results of the food safety analysis against at least one pre-defined standard for assessing food safety; and provide a certificate of analysis for the lot of grain detailing the extent to which the lot of grain meets the at least one pre-defined standard for assessing food safety; and a quality analyzer, comprising at least a plurality of programming instructions stored in the memory of, and operating on at least one processor of, a computing device, wherein the plurality of programming instructions, when operating on the processor, cause the computing device to: receive or obtain data from the image processor for a sufficient number of images from a single lot of grain to constitute a statistically representative sample for the lot of grain; compare each pixel map in the data against pixel maps from reference images of damaged grains of the type being inspected; perform a quality analysis, based on the pixel map comparisons, comprising at least the type and extent of damage for each individual grain and the percentage of damaged grains in the data for the statistically representative sample; and compare the results of the quality analysis against at least one industry standard for assessing grain quality; and provide a certificate of analysis for the lot of grain detailing the extent to which the lot of grain meets the at least one industry standard, is disclosed.

According to another preferred embodiment, a method for automated food safety analysis, quality analysis, and grading of grains, comprising the steps of: receiving, at an image processor, comprising at least a plurality of programming instructions stored in the memory of, and operating on at least one processor of, a computing device, a digital image of grains; identifying and counting within the image the areas associated with individual grains; extracting dimension information for each individual grain identified; creating, for each individual grain identified, a pixel map of the color data for each pixel within the area of the image associated with that individual grain; transmitting or store the data comprising individual grain count, dimension information, and pixel map for each individual grain for analysis; receiving or obtaining, at a food safety analyzer, comprising at least a plurality of programming instructions stored in the memory of, and operating on at least one processor of, a computing device, data from the image processor for a sufficient number of images from a single lot of grain to constitute a statistically representative sample for the lot of grain; comparing each pixel map in the data against pixel maps from reference images of infected grains of the type being inspected; performing a food safety analysis, based on the pixel map comparisons, comprising at least the type and extent of infection for each individual grain and the percentage of infected grains in the data for the statistically representative sample; comparing the results of the food safety analysis against at least one pre-defined standard for assessing food safety; providing a certificate of analysis for the lot of grain detailing the extent to which the lot of grain meets the at least one pre-defined standard for assessing food safety; receiving or obtaining, at a quality analyzer, comprising at least a plurality of programming instructions stored in the memory of, and operating on at least one processor of, a computing device, data from the image processor for a sufficient number of images from a single lot of grain to constitute a statistically representative sample for the lot of grain; comparing each pixel map in the data against pixel maps from reference images of damaged grains of the type being inspected; performing a quality analysis, based on the pixel map comparisons, comprising at least the type and extent of damage for each individual grain and the percentage of damaged grains in the data for the statistically representative sample; comparing the results of the quality analysis against at least one industry standard for assessing grain quality; and providing a certificate of analysis for the lot of grain detailing the extent to which the lot of grain meets the at least one industry standard, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 23 shows an exemplary certificate of analysis.

DETAILED DESCRIPTION

Figure 1:
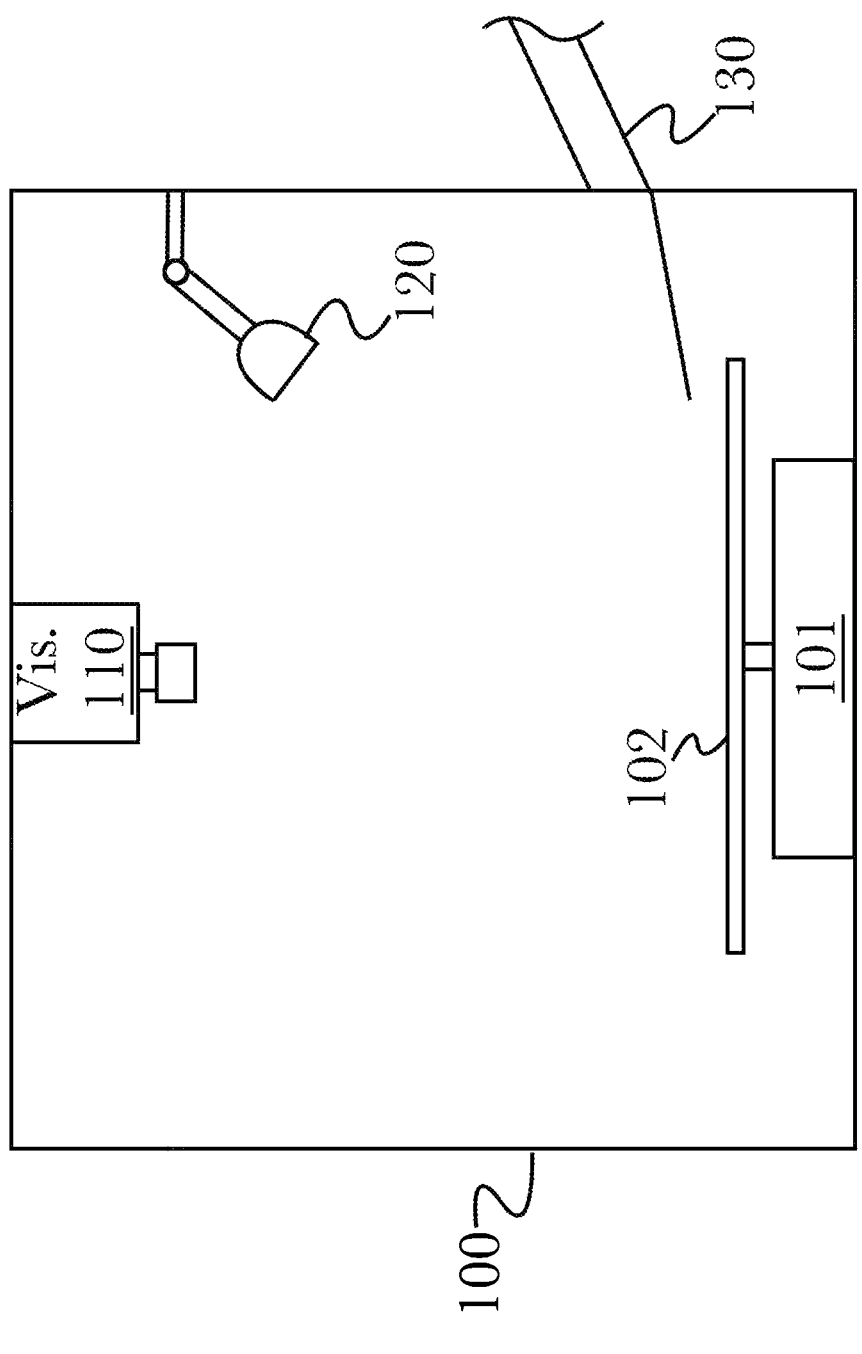
FIG. 1 is a diagram illustrating an exemplary system for automated grain inspection and analysis, according to a preferred embodiment of the invention.

The inventor has conceived, and reduced to practice, a system and method for automated grain inspection and analysis of results, that inspects grains using a plurality of light spectra, analyzes the results, and produces detailed reports from the analysis.

What is needed is a system and method that measure, count, calculate, classify, and report size, shape, color, color distribution, damages, unsafe properties, quality score and other important properties that replace the manual and subjective interpretation methods based on description and pictures as reference, with accurate, measureable, repeatable, and empirical values. The ability to quantify good grains, damages, health risks, commercial grading and quality score using an absolute and objective process and the results of such a process are critical to the entire agriculture ecosystem and humanity in general. The results include safer food, higher quality and desired taste and texture for the consumer. In addition, accurate data measured by a robust system can be used for further analysis, process control, yield improvement, event prediction, alerts, and other uses thus enabling collaboration among the industry ecosystem to help address issues in a faster and more reliable way.

The system includes cameras to capture the image of each grain in a sample, and illumination units to combine light sources with visible and invisible wavelengths (for example, infrared or ultraviolet). Both the cameras and light controls are connected to a computer that runs operating software and application programs. In addition, the results of an inspection may be uploaded automatically to cloud applications that store and later use the data and images to run additional applications where big data is required from one or more instruments in a facility or multiple facilities, or in different steps in the processing, or steps in the supply chain. For example, quality trends and comparisons, alerts on food safety events, issue of certificates of analysis, visualization of color distribution in grains, or other uses.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "damage" as used herein means imperfections in grain caused by physical factors such as heat, cold, flood, mechanical damage from harvesting, transportation, and processing, and insect damage from chewing, boring, or tunneling.

The term "disease" or "infection" as used herein means any of a number of diseases and infections that affect grains, the most common of which are various types of fungal infections.

The term "grain" or "grains" as used herein includes the grains, seeds, and pulses of plants.

The terms "lot" or "batch" as used herein mean a quantity of grain being transported, sold, processed, analyzed, certified, or otherwise handled or disposed of as a single unit.

The term "soundness" as used herein means the overall visual grain quality. The soundness of a particular grain is diminished by damage and disease. Industry standards such as the Official United States Standard for Grain set forth the factors for determining soundness of grain.

Conceptual Architecture

FIG. 1 is a diagram illustrating an exemplary system 100 for automated grain inspection and analysis, according to a preferred embodiment of the invention. According to the embodiment, a system 100 may comprise a feeder 130 configured to direct grains onto a receptacle 102, for example using a rigid or flexible chute 130 that is angled to control the rate of flow onto a flat or curved receptacle 102 to maintain a desired grain density on the surface of receptacle 102. This allows feeder 130 to feed a limited amount of grain to be inspected onto receptacle 102 that can spread the grain out for proper inspection, for example using mechanical means such as a vibratory motor 101 that agitates receptacle 102 to distribute grains on the surface of receptacle 102. Receptacle 102 may also be manipulated either manually or automatically to improve spreading of the grains, for example the intensity of a vibrating motor 101 may be altered automatically if the grain distribution is not within desired parameters (for example, as may be detected using an image sensor 110). A plurality of light emitters 120 may be used to project visible light onto receptacle 102 and illuminate any grains scattered thereupon, and a plurality of corresponding image sensors 110 may be used to capture image data by scanning receptacle 102 while illuminated. Optionally, light emitters 120 and imaging sensors 110 may be tuned to various wavelengths that may lie within or outside the visible spectrum (for example, infrared or ultraviolet), as is described below in FIG. 2. System 100 may be connected to a computing device or a system of computing devices, such as a network or local arrangement of computers and computing hardware, that may be configured to capture and analyze grains using the components of system 100, as described below in FIG. 3.

Figure 2:
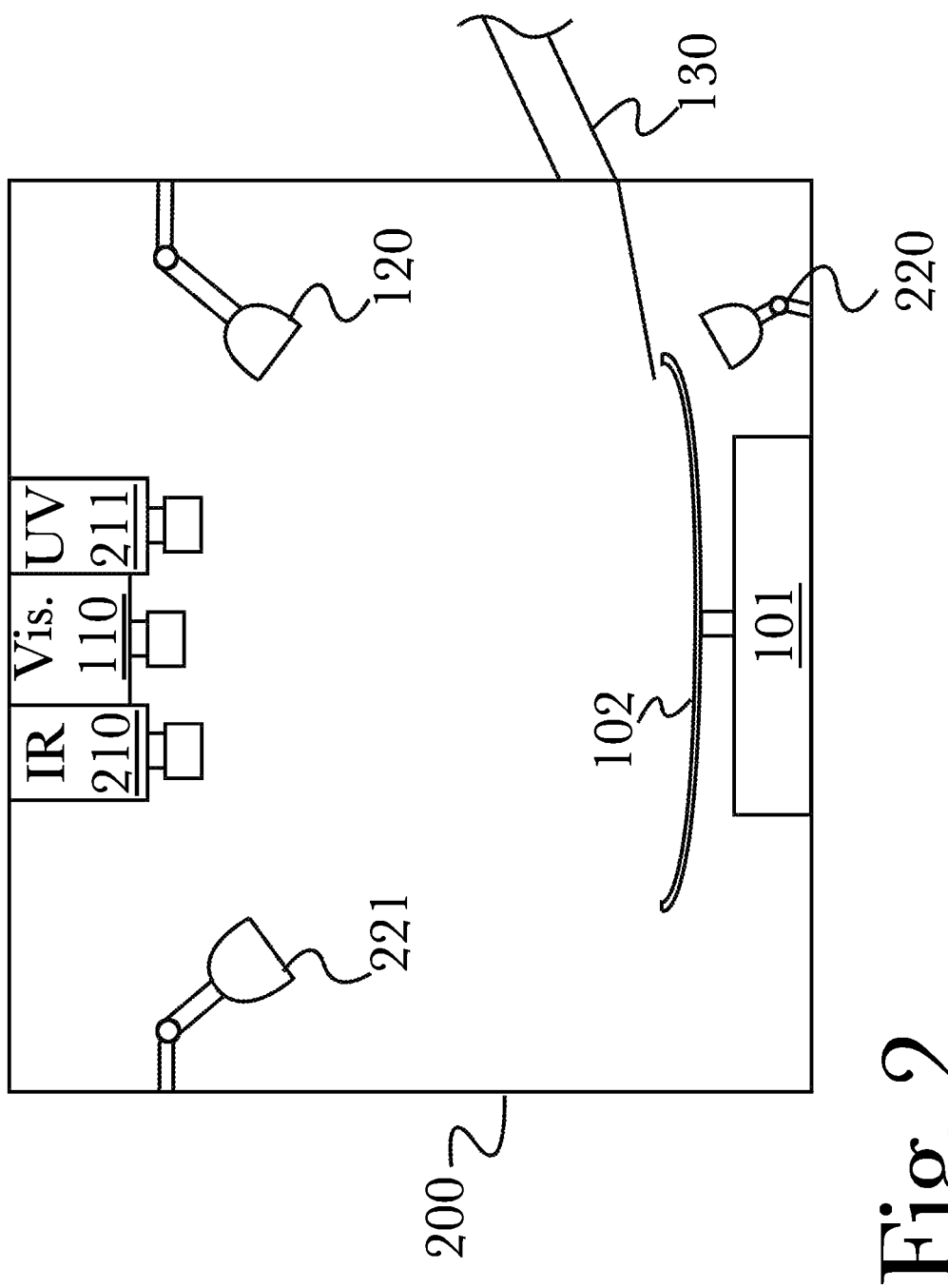
FIG. 2 is a diagram illustrating an exemplary alternative system architecture for automated grain inspection and analysis, according to another embodiment of the invention.

FIG. 2 is a diagram illustrating an exemplary alternative system 200 for automated grain inspection and analysis, according to another embodiment of the invention. According to the embodiment, a system 200 may comprise a plurality of light emitters 120, 220, 221 of different wavelengths chosen from the spectrum of light, for example ranging from infrared through ultraviolet positioned above and/or below receptacle 102 (in this embodiment, a concave receptacle is shown to illustrate an additional possible arrangement), to illuminate grains on the surface of receptacle 102 with various wavelengths of light from above and below. A plurality of corresponding images sensors may be used to scan the illuminated grains, for example sensors tuned to capture visible light frequencies 110 as described above in FIG. 1, as well as sensors configured to capture infrared (IR) 210 and ultraviolet (UV) 211. In this manner, multispectral analysis may be performed on grains to count and analyze them, providing detailed quantitative and qualitative results that may be presented in various visualizations and reports, as described below in FIGS. 4-6.

In some cases, one of the color properties assessed in particular may be a degree of chalkiness of some or all of the grains dispersed on the surface of receptacle 102, and more in particular afterglow effects of such chalkiness (for example, multispectral illumination of the grains may reveal certain spectral behaviors associated with chalkiness that may otherwise be difficult to observe, revealing details otherwise obscured in any one particular spectral band). Light emitters 120, 220, 221 may use one or more, or a combination, of LEDs of different color, or by specialized uni- or multi-spectral halide or xenon or similar discharge lamps, or other light-emitting sources, and may be configured as specialized uni- or multi-spectral lamps, and may optionally be used with any or a combination of filters to further alter the emission spectra. During sampling of grain, lights may be sequenced as needed to achieve optimal image quality or to tune for specific image or grain features, such as to highlight blemishes or examine for disease (either in general, or to examine for specific diseases or pathogens) or grain damage, or to classify grain type or variety, or to correlate with information regarding the location, methods, or other conditions of the grain's growth, harvest, storage, transport, or processing.

In addition to cameras, other sensor types may include humidity sensors, temperature sensors, light sensors, scanners, scales, or other sensor types, and the data from the sensors and cameras may be used to measure all the details of blemishes, diseases or any other damage to each grain, so the system can identify the grain type, its variety, and its diseases and damages. For each grain, a pixel count may be calculated and then organized in a histogram for color and size. These histograms may be hierarchical and may be used to identify and help quickly categorize grains, diseases, qualities, or any measurable metric.

All this information may be sent over a network to a server or a cloud, and compared to a reference database. Changes over time may be tracked by region, enabling companies, governments and NGOs to assess the safety and sufficiency of the food supply and to recognize supply problems stemming from new diseases quickly and early on.

System 100, 200 may be implemented in a combine harvester or other harvesting or farming equipment, for example diverting a sample from a harvest stream according to a configured time, location, or other schedule or pattern. This may be used to enable real-time (or near real-time) analysis of a harvest, for example to produce a harvest quality map that may be used to optimize field preparation (such as to direct the use of fertilizers or pesticides, for example) or for storage or transmission. Grain may also be classified and tracked based on harvest time, location, methods, or other such metrics, which may optionally be presented alongside analysis results in reporting.

Figure 3:
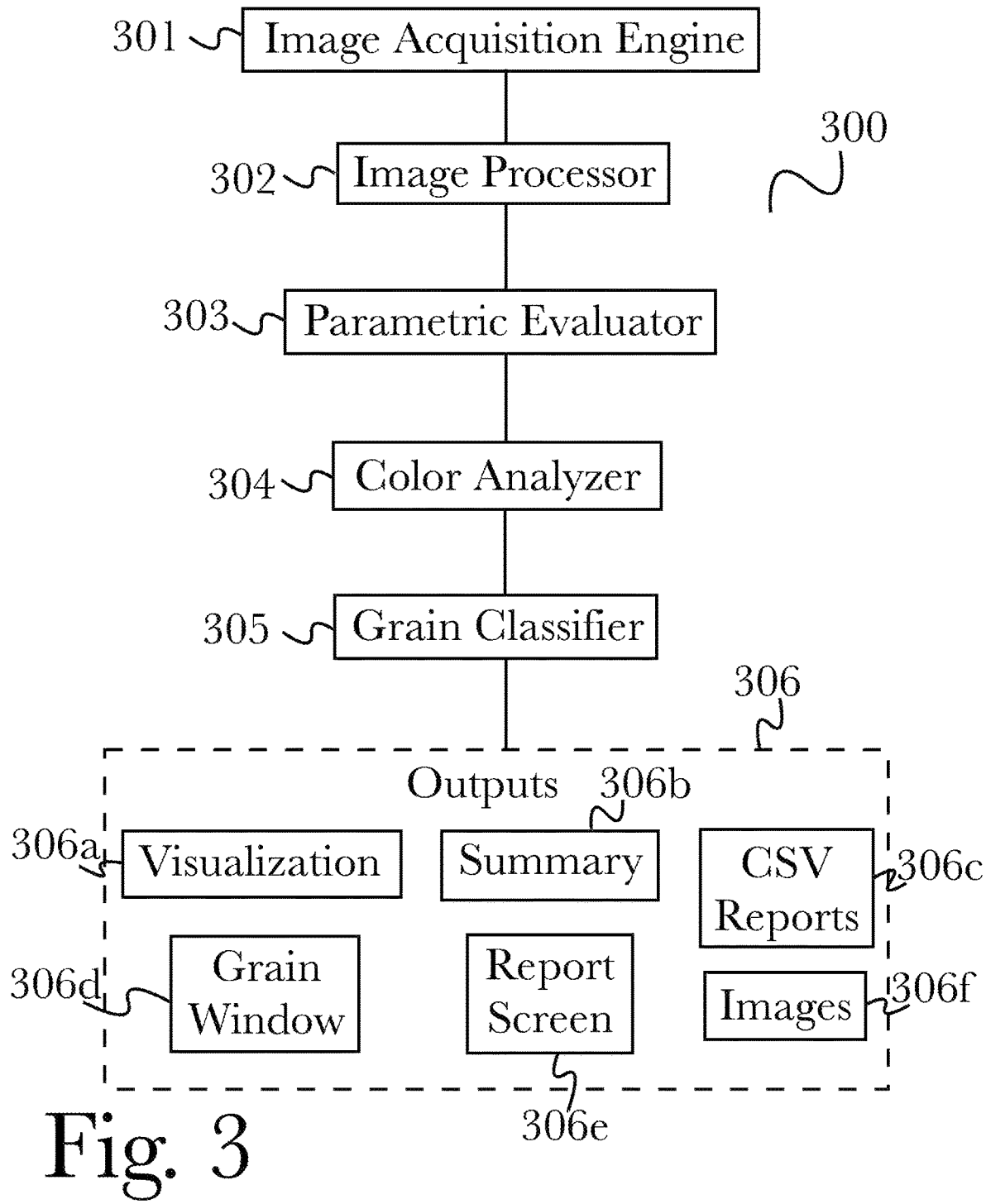
FIG. 3 is a flow diagram illustrating an exemplary logical architecture for automated grain analysis, according to another embodiment of the invention.

FIG. 3 is a flow diagram illustrating an exemplary logical architecture 300 for automated grain analysis, according to another embodiment of the invention. According to the embodiment, an image acquisition engine 301 may collect data from a plurality of image sensors 120, 220, 221 in a system for automated grain examination. Image sensor data may then be provided to an image processor 302 that may perform any or a combination of image processing tasks on the data, such as (for example, including but not limited to) normalization, amplification, color balancing, colorization, desaturation, edge-finding or erosion, or any other image processing task that may be used to improve the suitability of image information for a particular desired analysis result or operational configuration (for example, processing an image to expedite analysis or to reduce system load during parallelized operation). Processed image data may then be provided to a parametric evaluator 303 that may compare the processed data against configured parameters for analysis, for example to verify that the image data is within desired parameters for optimum results. A color analyzer 304 may then be used to analyze the color of grains within the image data, for example according to a configuration file as described below with reference to FIGS. 4-5. Color analyzer 304 may be used to calculate a pixel count that may then be organized in a histogram for color and size, and pixel counts and histograms may be arranged hierarchically and used in grain classification or visualization as described below. A grain classifier 305 may be used to classify specific grains, or a sample group as a whole, for example to apply specific labels such as size or texture identifiers or to accept/reject grains based on analysis results. For example, if a sufficient quantity of grains in a sample are below a configured quality threshold (as determined using parameter information from parametric evaluator 303 and grain color information from color analyzer 304), then a sample may be marked as unsatisfactory. A variety of outputs 306 may be produced for further review, storage, or transmission, according to various aspects and implementations. Visualizations 306*a* may be used to surface analysis data for human review in a readily-understood fashion, for example using color wheels (as shown below in FIGS. 4-5). A summary 306*b* may be provided for a concise statement of analysis results, for example for publication or quick viewing when a large number of analyses must be checked or compared quickly. CSV reports 306c may be produced for storage and import into other software applications, such as for further analysis or for storage in a database with other information (such as to maintain a repository of historical analysis results). A grain window 306d may present a view of individual grains or groups of grains for manual inspection, for example if an ambiguous result requires human intervention to validate, or to enable an additional layer of quality control by including human verification for some or all analysis operations. A report screen 306e may be produced to consolidate analysis results into a human-readable interface with various analysis factors represented for viewing, such as the exemplary interface shown below in FIG. 6. Images 306f may be produced from image data used during analysis, for example to store "raw" or original image data alongside the results of analysis of the same data, or to produce images of grain that was analyzed for publication or storage.

Figure 7:
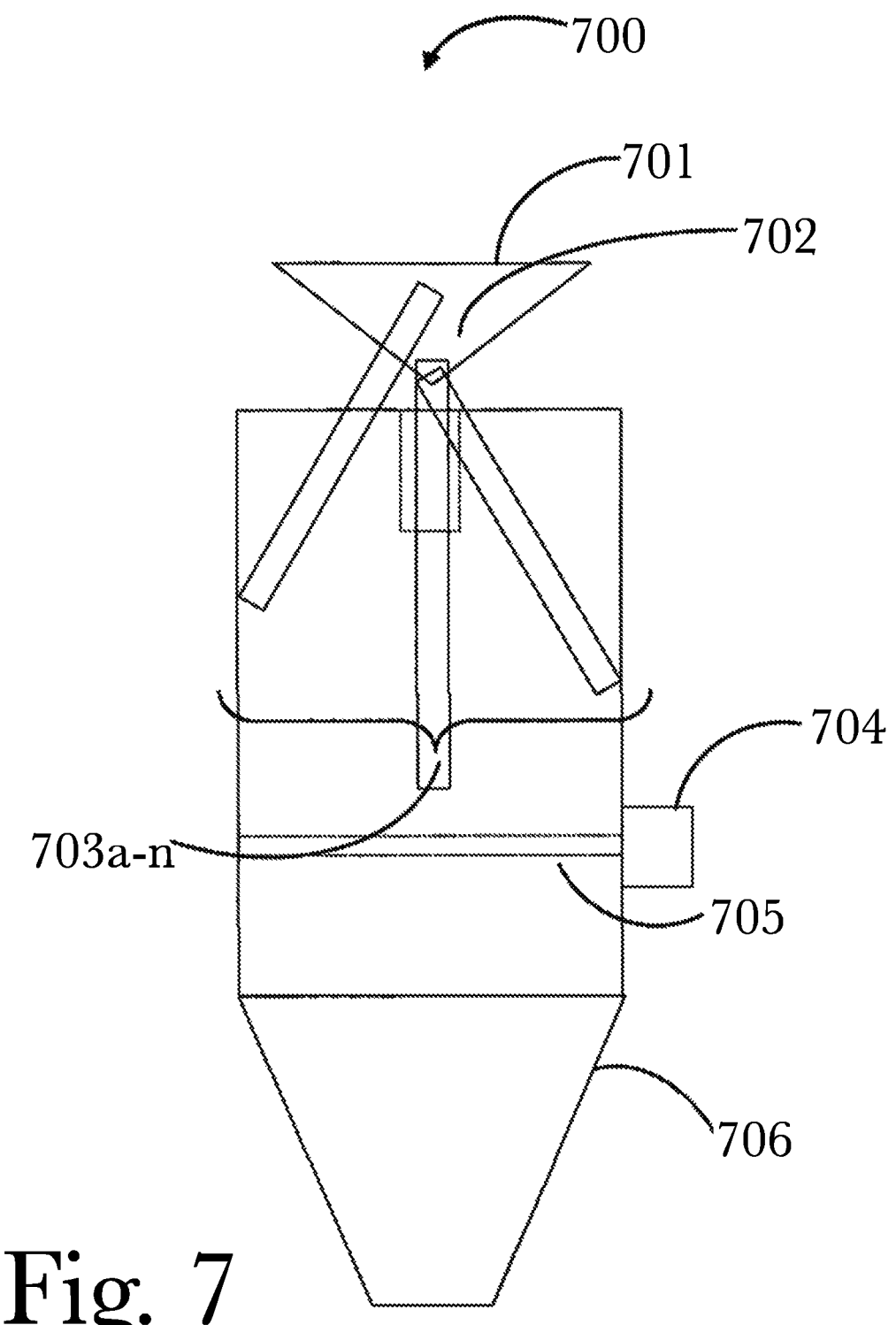
FIG. 7 shows an exemplary system for grain analysis, according to an embodiment.

FIG. 7 shows an exemplary system 700 for grain analysis, according to one aspect of the system and method disclosed herein. Inlet funnel 701 conducts grain samples via pipes 703a-n onto examination plate 705, which can rotate vertically in a full circle. Motor 704 shakes plate 705 to distribute the grains so a full sample can be captured by camera 702 for examination and analysis, as described in greater detail below. Lights (not shown here) may be installed in system 700 to illuminate grain on plate 705 during photography by camera 702. A software program on a computer, (not shown in this figure) controlling all elements, such as LEDs or other lights, motor to manipulate plate 705, etc. now analyzes the camera images of the grains, in some cases in different illuminations from the sources discussed throughout. In some cases, if the grains are too bunched up, the motor 704 that can manipulate the 705, for example by having a gear box, that when run in reverse, vibrates (if square) or turns (if round) the table horizontally rather than flip it for dumping the grains. Then the grains can be re-examined, and this may be repeated several times until a satisfactory view is achieve The grain is then dumped from plate 705 into outlet hopper 706.

Figure 8:
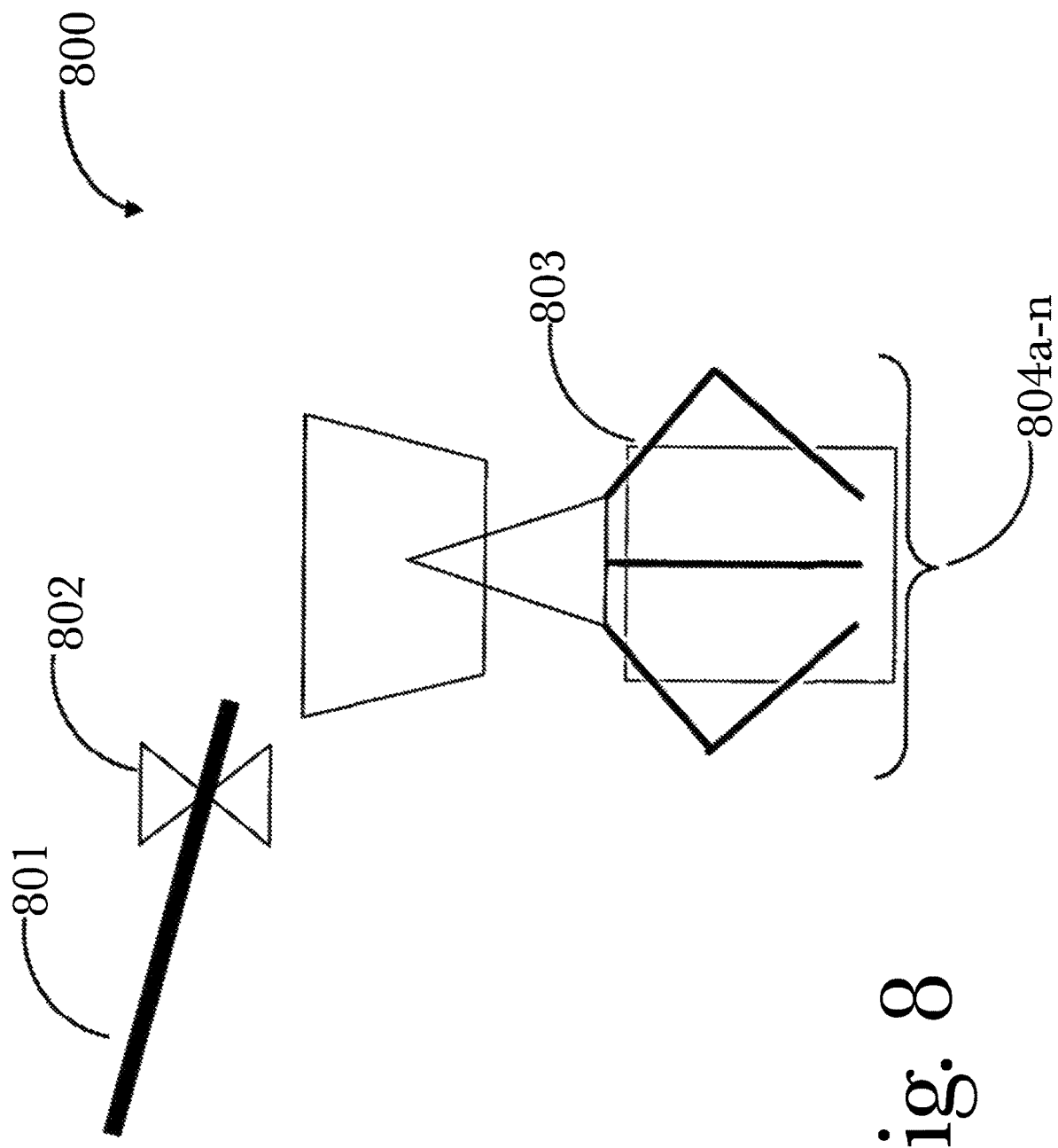
FIG. 8 shows details of an exemplary operation of the system and method disclosed herein

FIG. 8 shows details of an exemplary operation 800 of the system and method disclosed herein. Grain enters the system via pipe 801 past valve 802, which valve is calibrated to admit only a predefined weight or volume of grain into funnel 803 and thence via pipes 804a-n onto plate 805.

Figure 9:
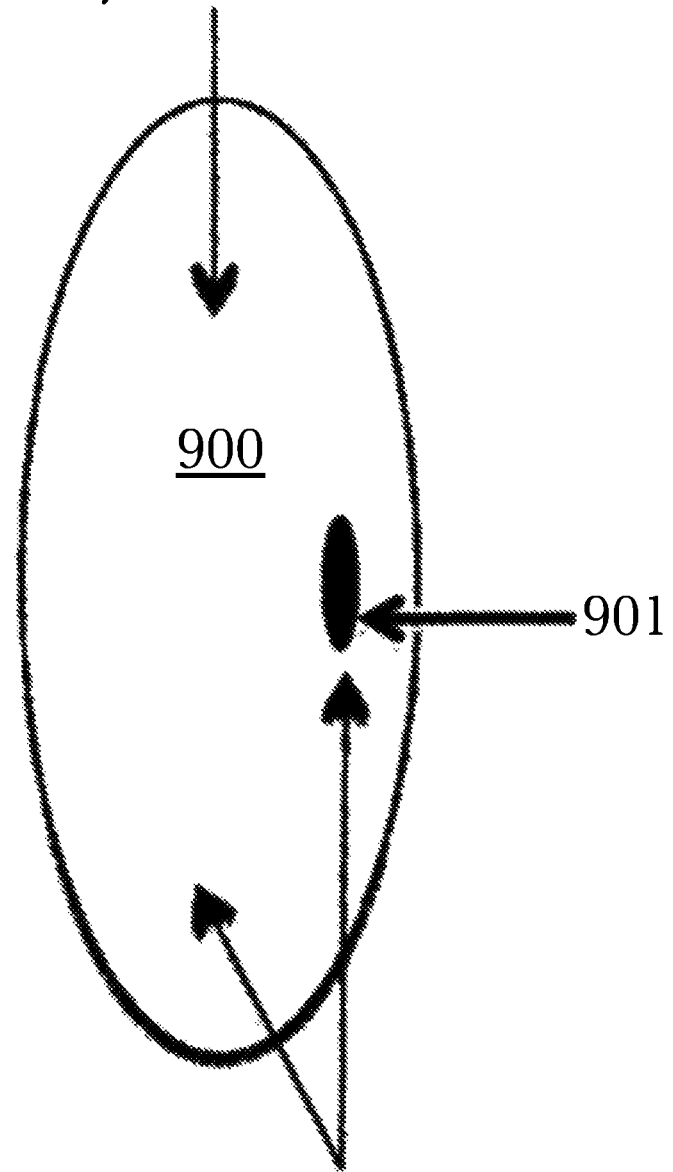
FIG. 9 shows the analysis of the area and color of a grain, according to an aspect of the invention.

FIG. 9 shows the analysis of the area and color of a grain 900, according to an aspect of the invention. According to the aspect, the total area of grain 900 may be considered to be a value of 100% of the area, while any damage to grain 900 may be defined as a percentage thereof. Grain 900 may be of a normal color according to a configured color scale, or it may be of an abnormal color either according to the color scale or based on the analysis of the % of the surface area that is an abnormal color (for example, there may be a defined color threshold above which the entire grain is deemed to be abnormal). Specific damages 901 may be identified and considered when determining if a grain is acceptable, for example by the nature or severity of the damage (such as a surface imperfection) or based on the portion of total area that is damaged (such as for color abnormalities, or cracks).

Figure 14:
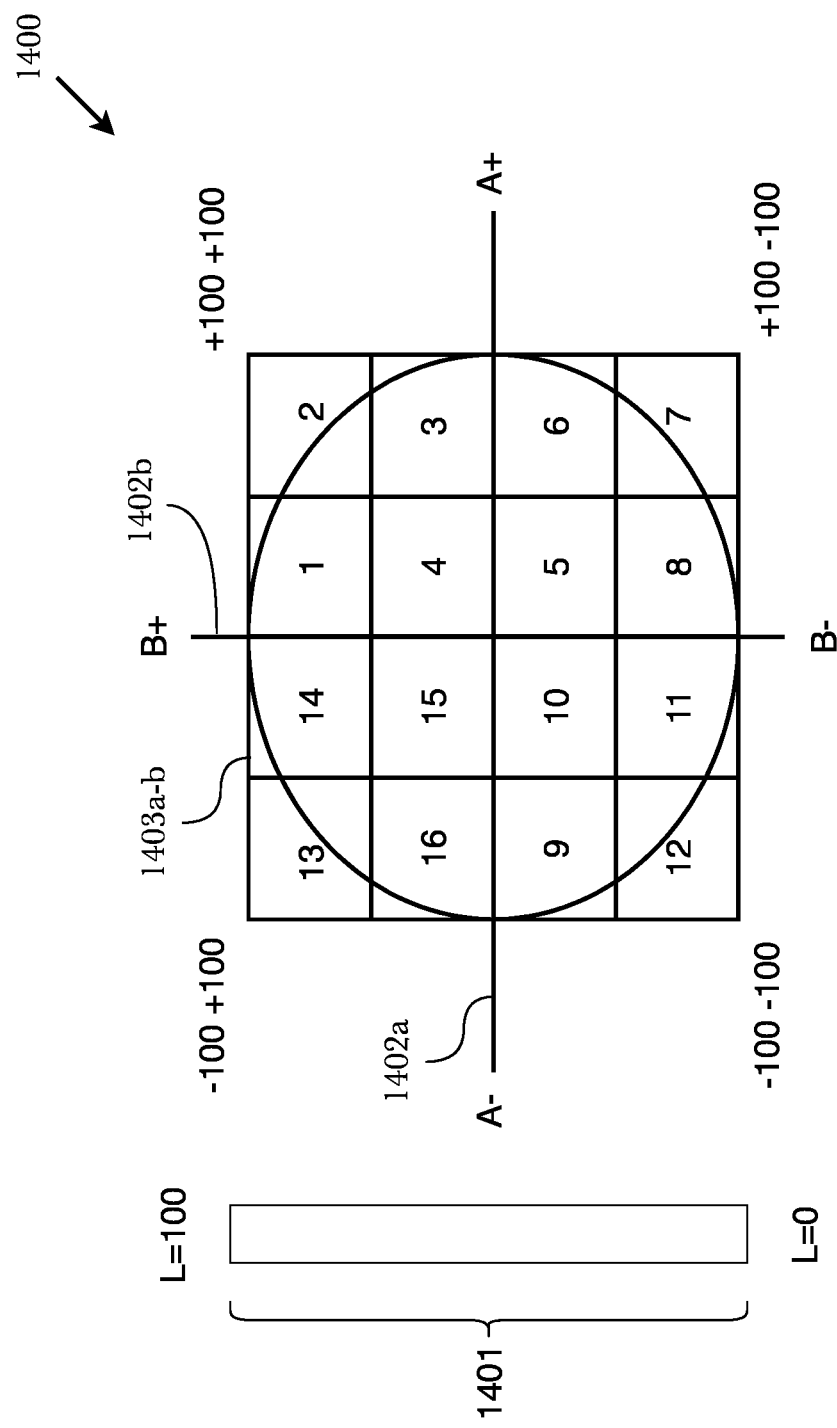
FIG. 14 shows an exemplary representation of the bin structures of AB chromaticity space of grain samples.

FIG. 14 shows an exemplary representation of the bin structures of AB chromaticity space 1400 of grain samples. For a sample, each grain is presented in average, mode, and median. For the grains, each grain is represented by roughly 3000-6000 pixels. For a lab sample, the L range 1401 is typically set to be 0-100; the AB (XY) axes 1402a and 1402b may run from −100 to +100 and may be divided into 16 bins 1403a-n, for example. This number is somewhat arbitrary and may be changed for various reasons. In some cases, these numbers may be dynamically changed to maximize the number of bins (within the quadrants) 1403a-n. To run a sample, the system typically creates ten groups of L1-10 (L for lightness based on captured pixels). Each L group, typically, with 16 quadrants 1403a-n in a range of +/−100 to +/−100 AB axis 1402a, 1402b of chromaticity. For each L (Lxaby) group, a user places the pixel in the relevant *ab bin 1403a-n. The system then summarizes the number of pixels per bin, calculates each bin as a percent of area of the sample grain or object, and calculates the average of L-a-b for each bin. The system is now able to create a plot showing LAB-bin-average values, percent of area, and actual color. For more detail, see FIG. 15 below.

The chromaticity space is used in conjunction with color visual references provided by various groups, industries, and governmental agencies for identifying disease and damage in crops. For example, the USDA visual reference library contains color photographs of a variety of grain defects, disease, damage, contamination, spoilage, infection, and other factors, and USDA grading tables provide quality categories based on the color of rice kernel, milling degree, and maximum damages allowed per grade. Under current methodology, a human inspector needs to visually compare the actual grain with the provided pictures or descriptions as reference, and make qualitative judgment calls regarding disease, damage, and soundness. When using such reference, there is no qualitative number or specification of the color or the minimum area of the "heat damaged" spot. USDA visual references and other sources provide information on a variety of grain defects, disease, damage, contamination, spoilage, infection, and other factors. These visual references can be used to input color information into the system to recognize quantitatively, for example, mold contamination, which can be a health concern. These quantitative characterizations using chromaticity space are far more accurate than human visual inspection, and the results are more repeatable and reliable. A wide variety of grain-related health issues and food safety issues can be identified in this manner.

Figure 15:
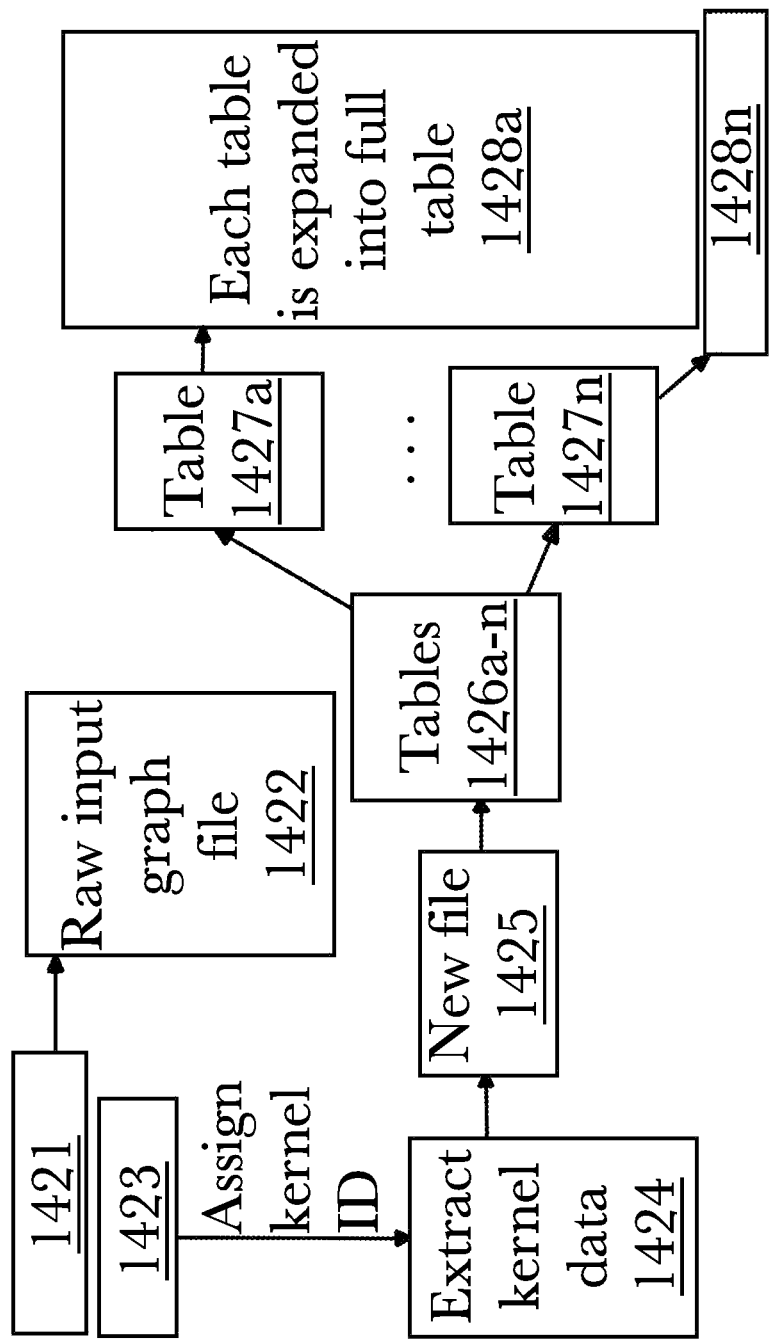
FIG. 15 shows the process by which grains are analyzed.

FIG. 15 shows the process 1420 by which grains are analyzed. In step 1421 the raw data file is loaded, as shown in chart 1422. In step 1423, the kernel number is fetched and the kernel ID is then assigned. Data of the identified kernel is extracted from a file 1424. Then a new file is created 1425, containing only data for that selected kernel or object and then the data is loaded into tables L1-L10 1426a-n. In the next step, additional tables 1427a-n are made. These tables contain the Lxaby matrices. Finally, table 1427a-n is expanded into a full table 1428a-n with mainly two values (Lab, Avg) for each pixel that then are output into a regular file. This file is then processed, for example in FIG. 22.

DETAILED DESCRIPTION OF EXEMPLARY ASPECTS

Figure 4:
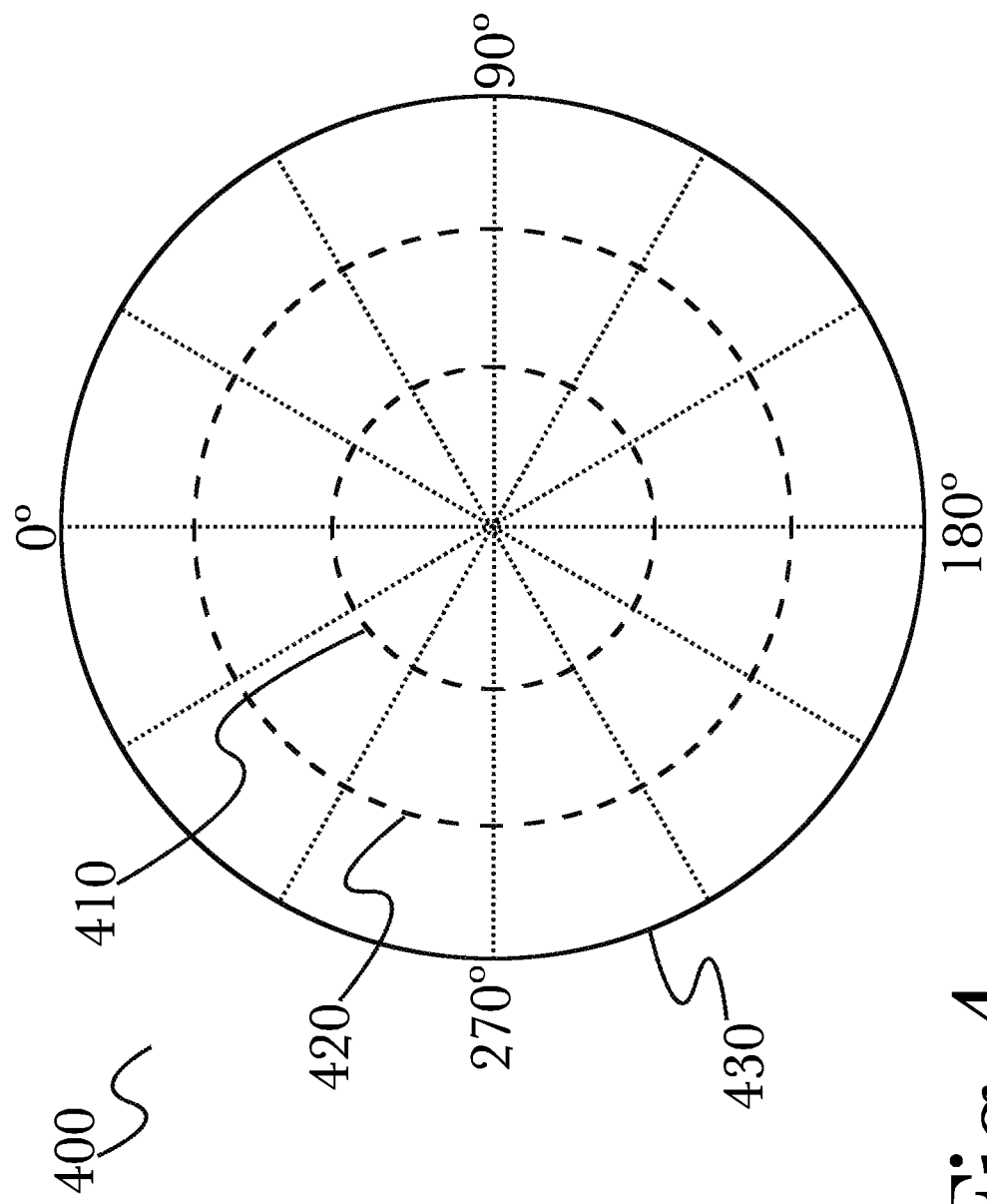
FIG. 4 is a diagram illustrating an exemplary color wheel for use in color calibration and analysis, according to an embodiment of the invention.

FIG. 4 is a diagram illustrating an exemplary color wheel 400 for use in color calibration and analysis, illustrating the use of configured zones 410, 420, 430, according to an embodiment of the invention. According to various aspects of the invention, color analyzer 304 may receive or produce a calibration file comprising configuration information that defines a plurality of color zones 410, 420, 430 on a color wheel 400, that may be used in conjunction with slices of color wheel 400 to represent color analysis points. A calibration file may be produce by scanning and analyzing a known sample of grains and fitting the calibration to the results, defining calibration values in terms of the results obtained from the use of a controlled sample that is known to produce specific values. Color zones are defined as an area covering the full 360° of the color wheel 400 out to a specified distance from the origin. For example, zone A 410 may be the area out to ⅓r (where r is the radius of the circle described by color wheel 400), zone B 420 may comprise the area from ⅓r to ⅔r, and zone C 430 may be the remaining outer area from ⅔r to r, or the outer boundary of color wheel 400. The specific values for each zone may be described in a calibration file for ease of storage and use. It should be appreciated that the specific visual arrangement shown in FIG. 4 may vary, for example orienting the color wheel with 0° at the bottom, side, or at an angle (rather than at the top as shown), or increasing the degree scale in a counterclockwise direction, rather than the clockwise direction shown, or other variations (which may be defined in a calibration file).

Figure 5:
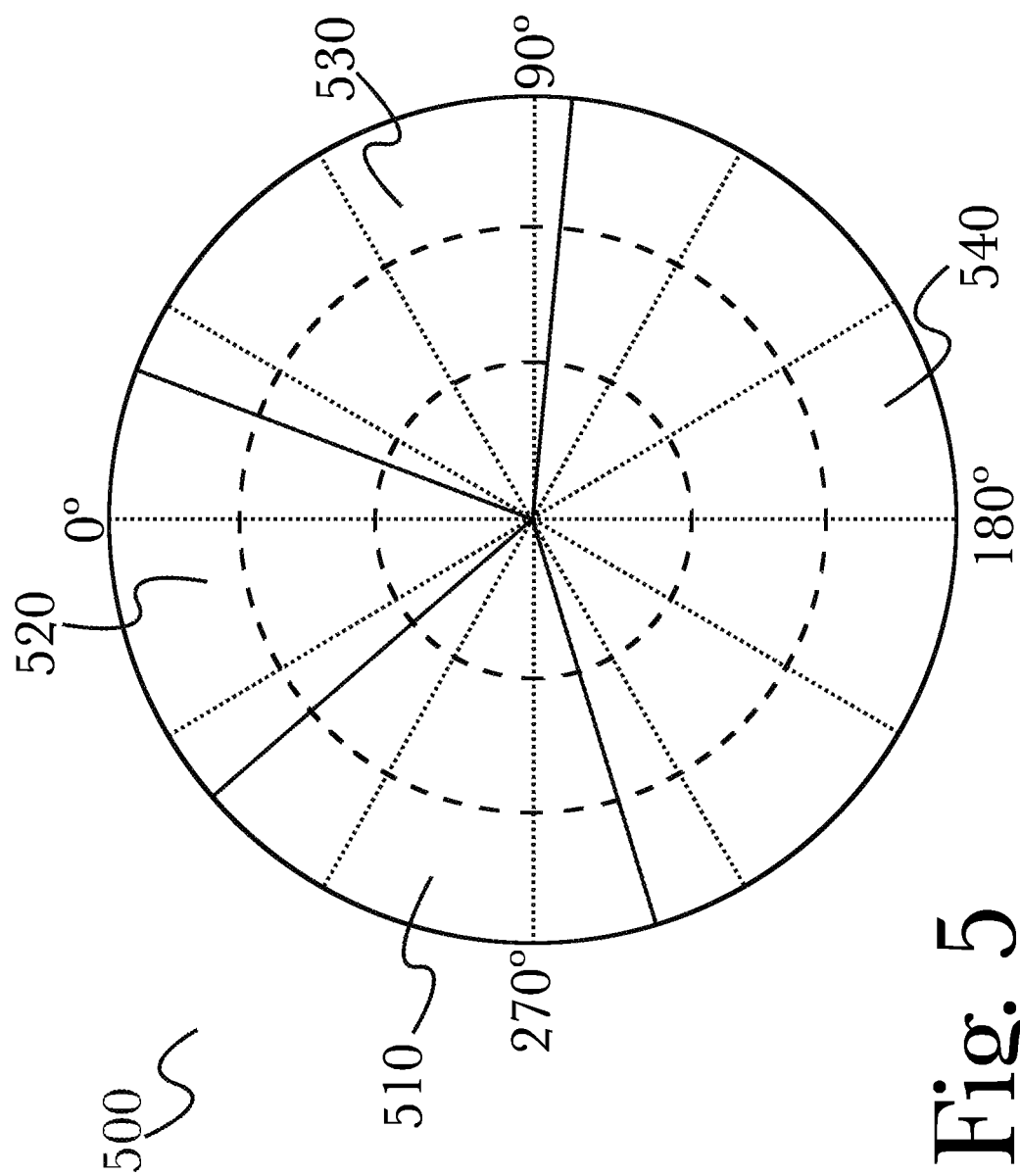
FIG. 5 is a diagram illustrating an exemplary color analysis result, according to an embodiment of the invention.

FIG. 5 is a diagram illustrating an exemplary color wheel 500 for use in color calibration and analysis, illustrating the use of configured color slices 510, 520, 530, 540, according to an embodiment of the invention. According to various aspects, color slices 510, 520, 530, 540 may be defined in a configuration file (optionally in addition to, with each slice comprising a circular sector within color wheel 500. In this manner, color analysis results may be represented as points within color wheel 500, with each point being placed within the slice and/or zone corresponding to the analysis results, producing a complete visualization for easy interpretation and further use of analysis results. This may be used both to visualize actual color (for example, when using visible-light analysis of grains, as described above in FIG. 1), as well as to visualize multidimensional data by assigning color to other data values. For example, grain size or degree of chalkiness may be represented as distance from the origin (and thus, placement within color zones 410, 411, 412) and grain density (or other metric) may be represented as a point's placement within color zones 510, 520, 530, 540. This may be particularly suitable for some visualization types, as a normal color wheel provides for easy visual indication of color hue and saturation, which may be natural analogues for certain analysis metrics such as chalkiness, size, damage, density, purity, or any of a number of metrics that may be represented on a bounded scale. Additionally, any particular visualization may have selectable or dynamically-adjustable granularity, for example to enable a zoom feature to precisely compare multiple points that may be grouped together, providing for a high-fidelity representation of information (for example, by using vectors to store pixel information rather than rounding values and thus introducing information loss).

Figure 6:
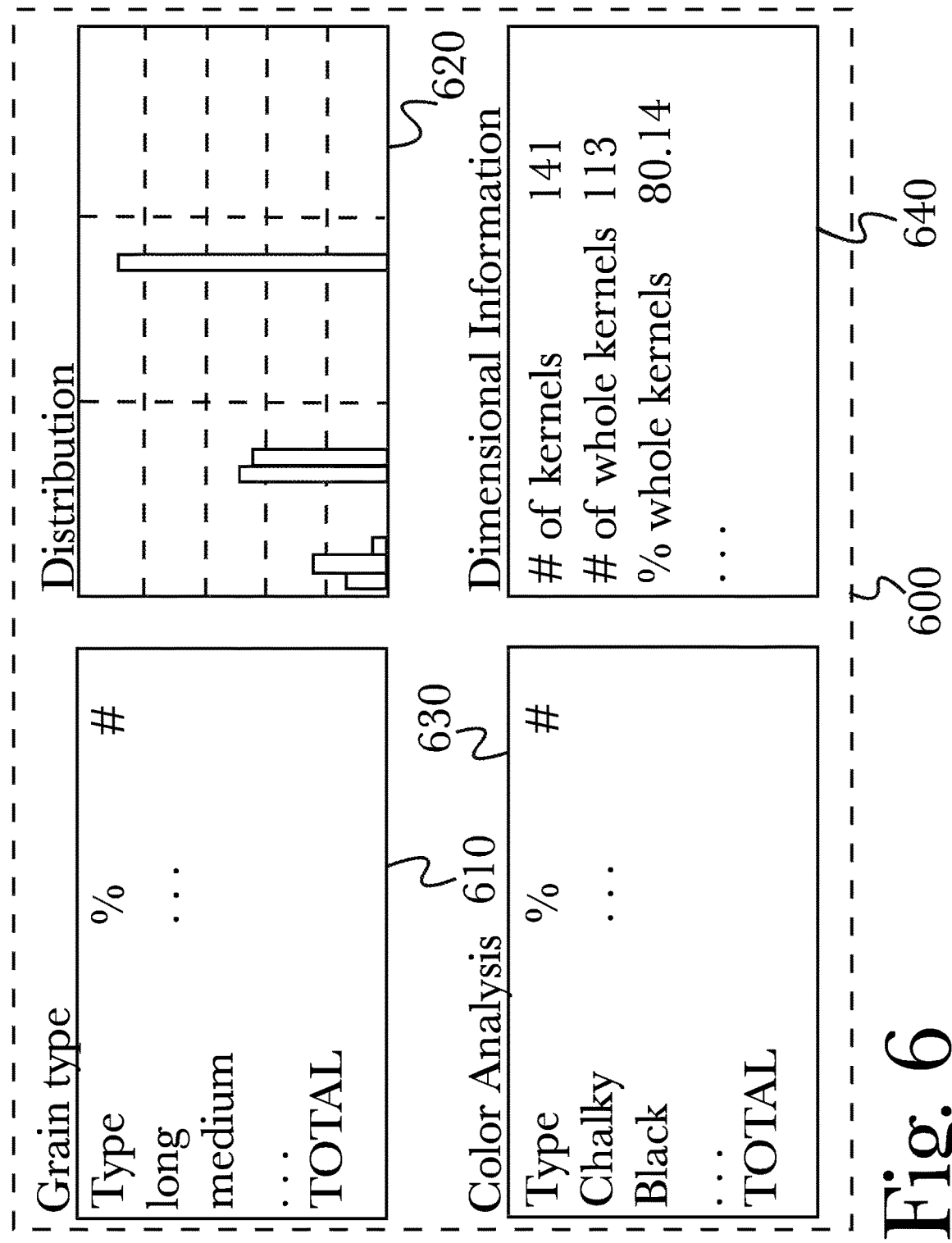
FIG. 6 is a diagram illustrating an exemplary reporting interface window, presenting report results of automated grain inspection and analysis, according to an embodiment of the invention.

FIG. 6 is a diagram illustrating an exemplary reporting interface window 600, presenting report results of automated grain inspection and analysis, according to an embodiment of the invention. According to the embodiment, analysis results may be collected and consolidated into a reporting interface 600 for ease of viewing, so they may be presented for verification or review by a human user or for use in publication (such as to publish analysis results of a grain sample for public viewing). Any number and combination of analysis metrics may be represented for viewing in appropriate formats, for example including (but not limited to) a list of grain types 610 that were analyzed, a list of metricized analysis results 630, a graph of grain metric distribution 620 such as color or size distribution or other metrics that may be represented in graph form, or sortable or filterable lists of grain attributes 640 such as physical dimensions. These interface views may optionally be fixed, for example as part of a loaded configuration or as part of a particular analysis operation (for example, an analysis focused on specific metrics may restrict the types of information presented for the sake of clarity), or they may be user-configurable and interactive, for example enabling drag-and-drop or other interaction so that a user may adjust the information or the presentation thereof.

Figure 16:
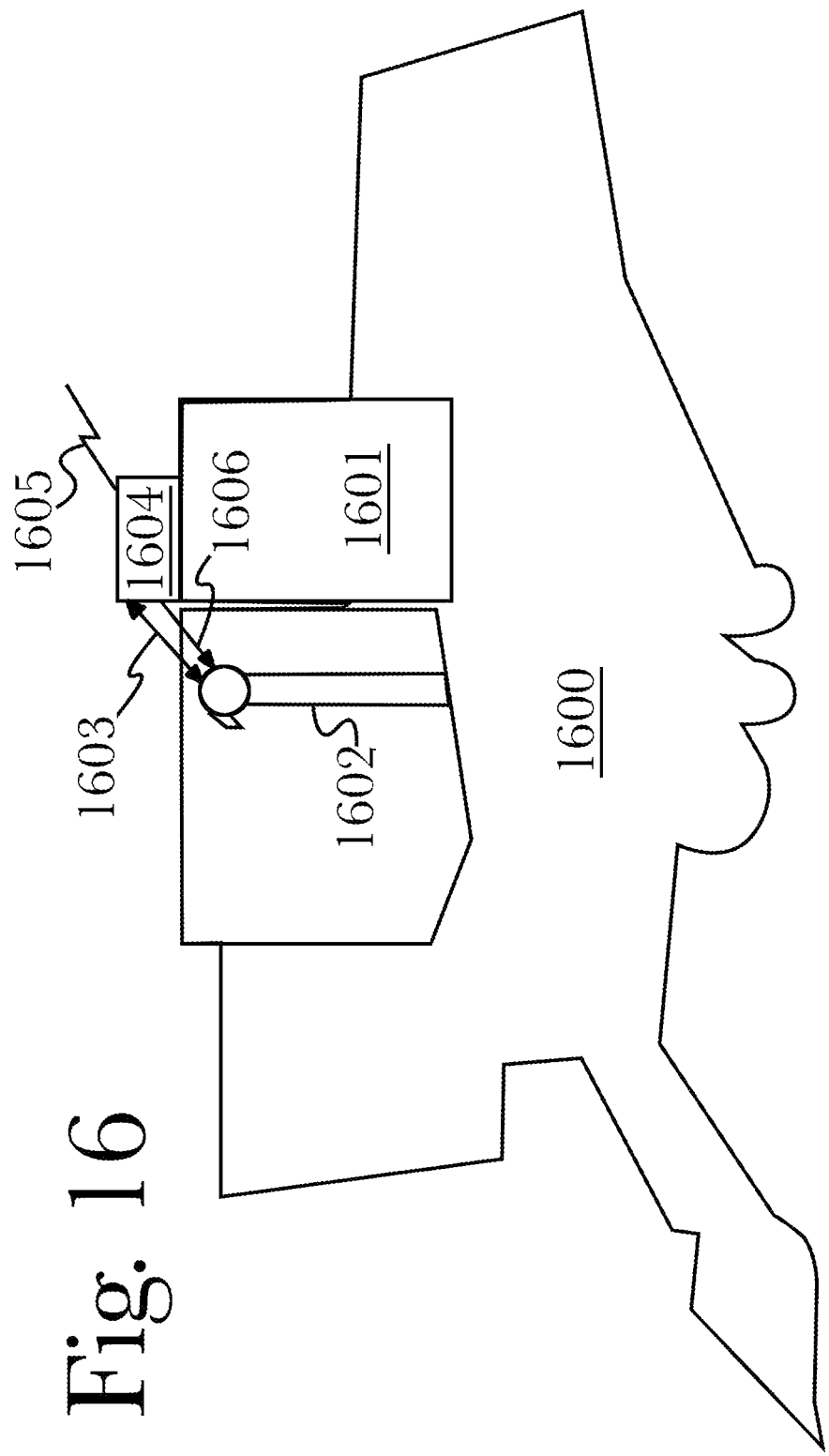
FIG. 16 shows a combine harvester, as currently used for harvesting crops.

FIG. 16 shows a combine harvester 1600, as currently used for harvesting crops. In some cases, the system and method disclosed herein may be implemented in such a combine or other harvesting system. Implementation may comprise occasionally diverting, for example based on schedule or location, a sample for analysis from a harvest stream. Such a system of diversion and analysis during harvesting operations could enable a user to create a near real-time harvest quality map, which may then be communicated to any desired destinations, thus permitting farm managers to optimize field preparation for the next season. Such preparation may for example include, but is not limited to, the use of fertilizers or pesticides where applicable.

Kernel analyzer system 1604 is integrated into combine harvest 1600 (typically near or on a driver cabin 1601) by having a sample pull 1603 that allows periodic pulling of samples from a main kernel feed 1602, a sample return 1606, and a link 1605 that either connect to the combine's own network or connects via a wireless uplink directly to the Internet, or both.

Additionally, kernel analyzer system 1604 analyzes and calculates the sorter "rejected grains bin" and provides information related to return on investment (ROI) to recover "good" grains from the rejected bin. In addition, it provides feedback to the sorter machine on its performance, how many good kernels are rejected on each bad kernel, and by inspecting the grains before the sorter station as an input to the sorter for optimization of speed vs. performance. This method can recover good grains that can be sold at a premium compared to damaged grains.

Figure 17:
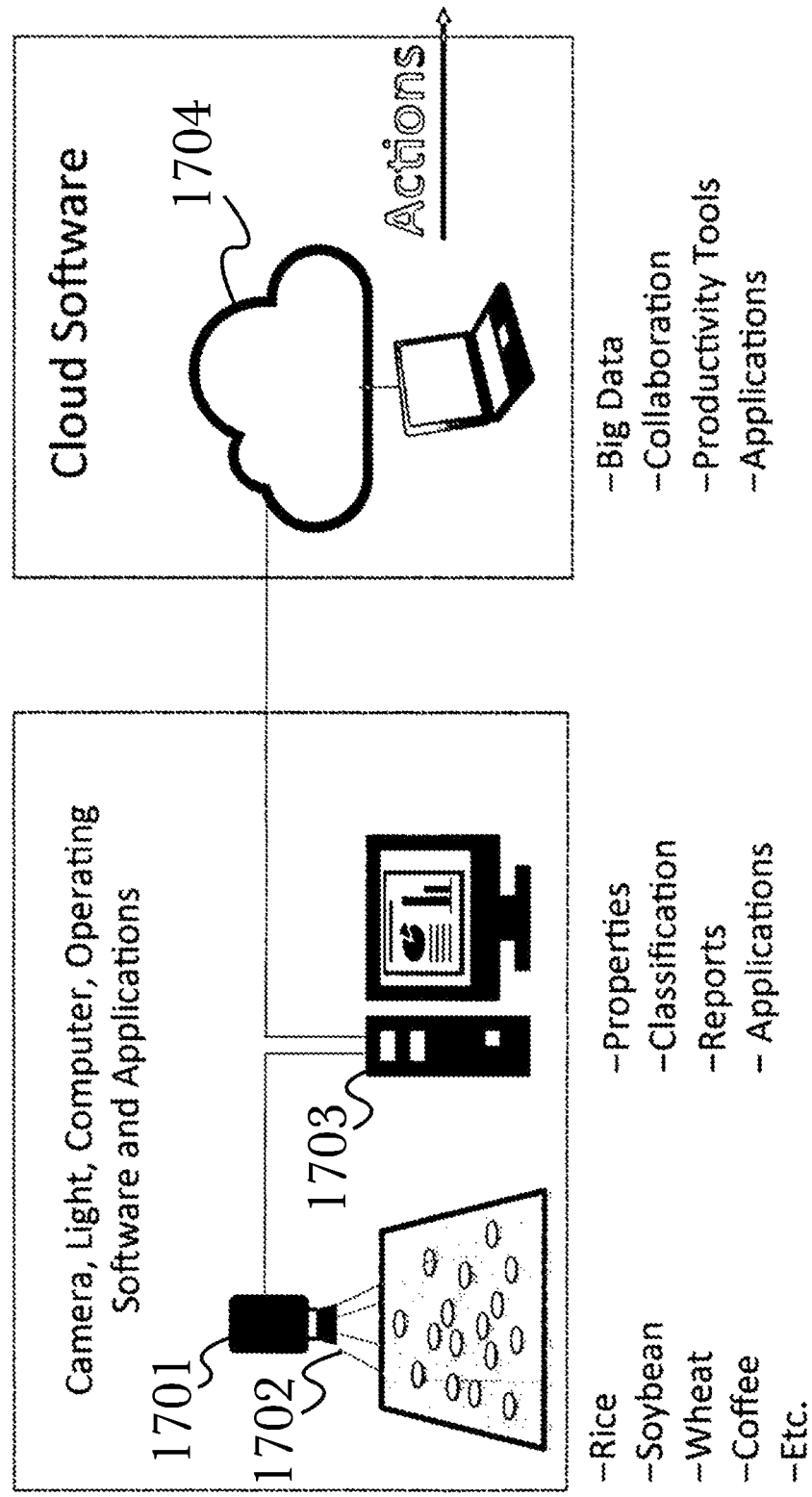
FIG. 17 shows an example of a system with camera, light and light control, computer and cloud application.

FIG. 17 shows an example of a system with camera 1701, light and light control 1702, computer 1703 and cloud application 1704. This system can measure grains of any kind from one grain to any amount that can be placed on a working area, for example 1500-2000 grains of rice (approximately 25 grams), or several thousand grains of Quinoa (approximately 10 grams), or other such uses.

Figure 18:
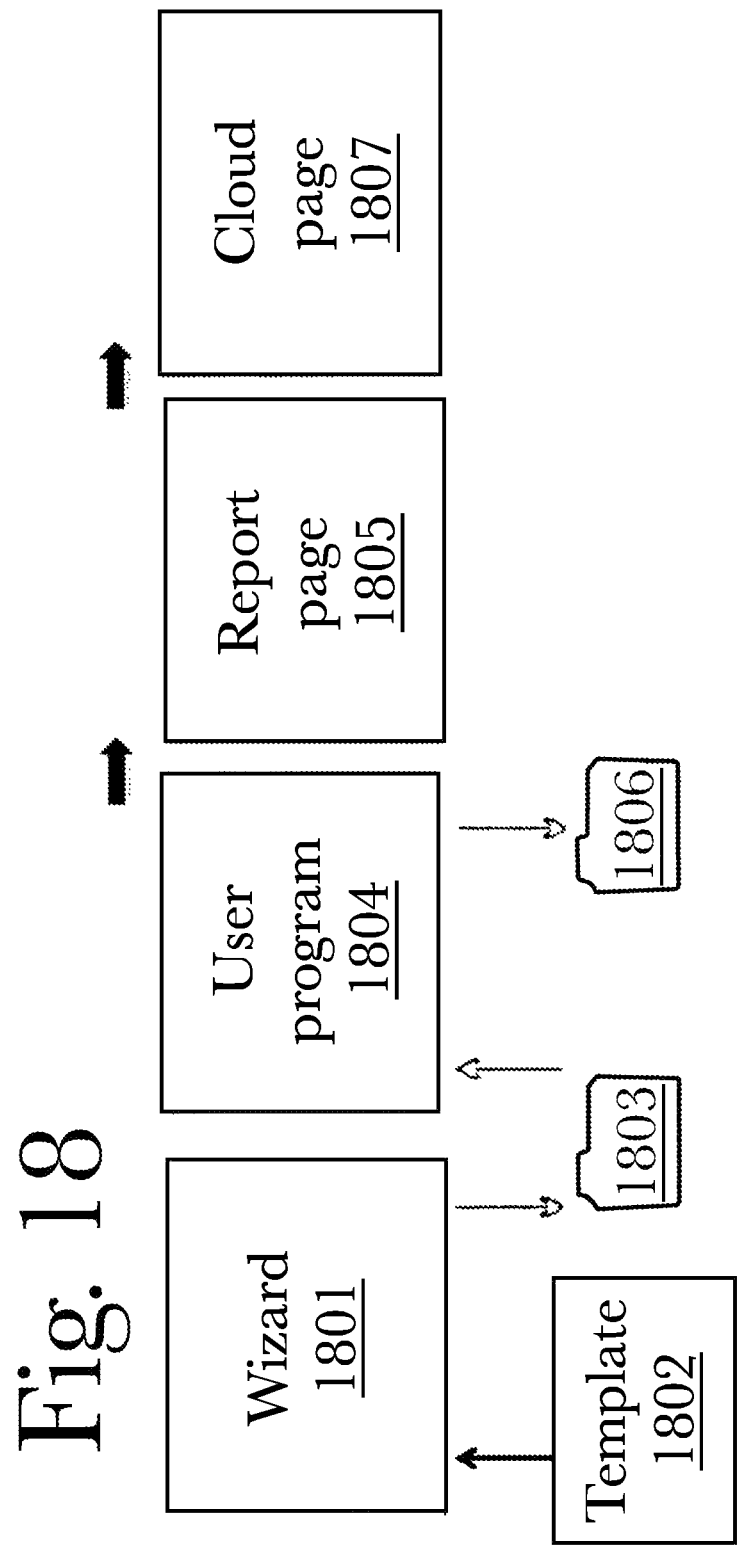
FIG. 18 shows the workflow of the system of FIG. 17.

FIG. 18 shows an exemplary workflow of the system of FIG. 17. This flow includes system operating software, graphic user interface, inputs, and outputs of application software. Wizard 1801 is a software program that uses a template file 1802 as input for the measurement basic setup and configuration of default parameters. A sample of grains (not shown) may be placed on a working area and the user progresses through all the steps of wizard 1801 to set all the parameters of the measurement, and at the end of the process a new calibration file is created. The calibration file can be for rice variety (for example, basmati or jasmine), for size (long, medium or short grain), for type (rough or paddy, brown, milled), or for special rice such as Wild or Arborio. In additional it may be for a specific quality standard (for example, Japan, Korea, USA) or by customer requirement either for tighter specifications such as rice grains for sake preparation or loose quality requirement when grains are to be used in food processing such as for rice crackers or pet food, or because of specific weather conditions when further adjustments are required. Wizard 1801 steps cover all grain properties and definitions to classify each grain as "good", "bad" (damaged), or "questionable", by color and dimensions (length, width, area, and calculations such as length/width ratio). All calibrations may be stored in a folder 1803 and used for testing matching relevant samples.

User program 1804 performs the actual measurements, classification and reporting. It receives as input a grain sample placed on a working area, and a calibration file that matches the grain type and test requirements. The outputs are summary results, visual classification of all the grains (for example, "broken", "chalky", "red", etc.) and provides tools to further review the results, such as a window where a user may click on a specific grain to view all the grain properties.

A report page 1805 provides additional information such as quantity of grain, distribution, types of grains in the sample, classification of all damaged grains, and statistics such as (for example), number of grains, number of broken grains, average length, or average width. In addition, a test results folder 1806 may be generated and saved, with the folder name including date and time plus optional text if entered by the user as a sample name. Files provide data on the sample level, grain level, and pixel level for each grain. Images of the sample provide information on the visuals, classifications, and results. Images may be used to upload an image of the sample for re-testing in case of dispute or investigation, and a daily results file may be updated to maintain daily status. Web-based or local cloud page 1807 includes a set of software applications including (for example) alerts, visualization, reporting, trends, dashboard, and other productivity tools provided to improve quality, yield, and food safety. Wizard 1801 enables a user to set a file name and the method to define grain type, such as by length or length-to-width ratio, and uses USDA or other standards as defaults with the option to modify values. The wizard 1801 provides a method to set color value and limits (for example, maximum area to classify "red damages" in a grain), and a summary results screen with classification of all detected damages. In addition to the system's capability to measure, classify, and report grain status, it also provides a set of applications that bring new methods to address the grain industry resulting in better quality, safer food, higher yield, and greater profit.

Figure 19:
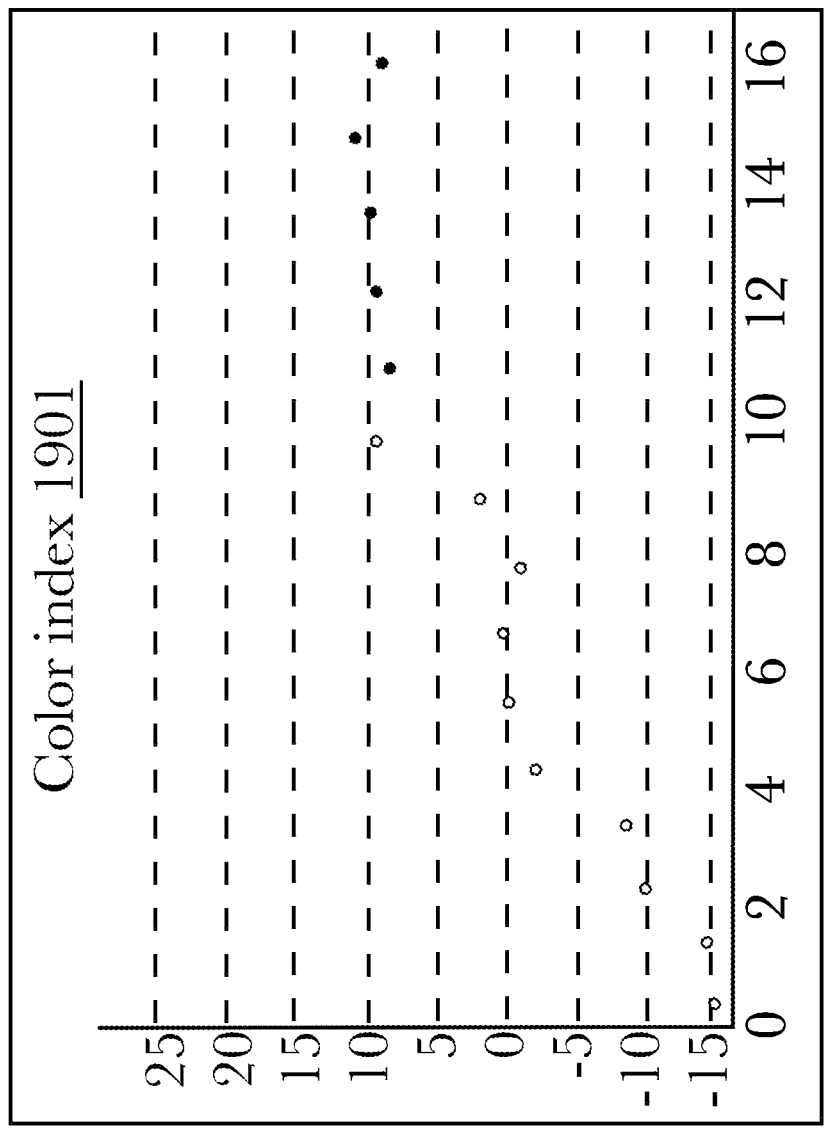
FIG. 19 shows a process for milling yield management.

FIG. 19 shows an exemplary process for milling yield management. Yield management is based on measurement of dimensions, color and calculation of the milling process endpoint, which means a desired milling level and optimized yield that eliminates over- or under-milling. 1901 is a color index presentation of all the samples 1910*a-n*. What is missing in the current art is ensuring that the milling process reached its desired yield level, not over- or under-milled; therefore, the system uses the combination of color with rice grain dimensions.

Figure 20:
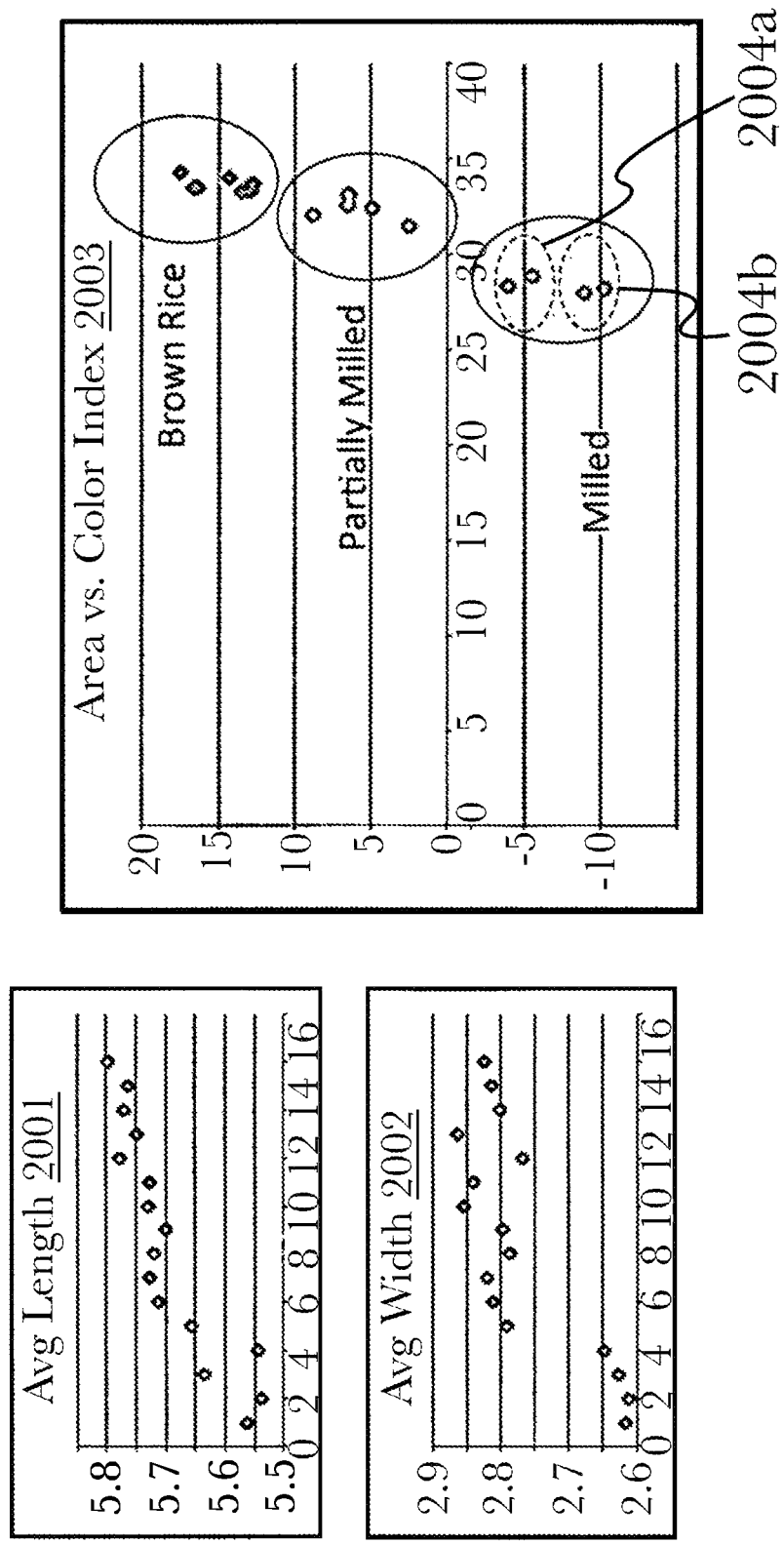
FIG. 20 shows a software interface for milling yield management.

FIG. 20 shows a software interface for milling yield management. Shown is a distribution of length 2001 and width 2002, while graph 2003 presents the combination of calculated area with color. In addition, the graph 2003 shows that there are two groups of milled rice 2004*a-b*; both groups look good visually but one 2004*b* is over-milled as determined by the system.

Figure 21:
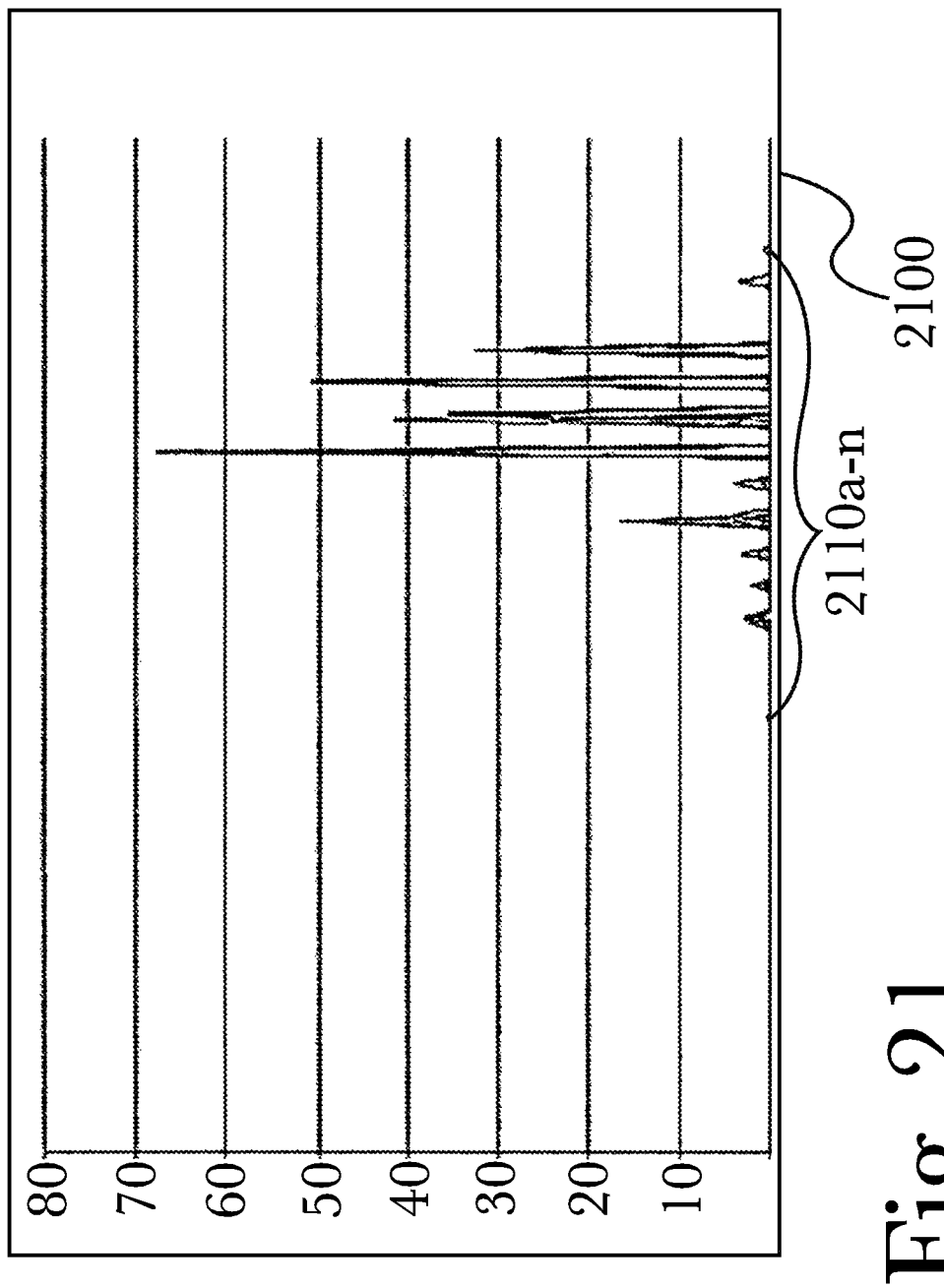
FIG. 21 shows an exemplary histogram of the Lab values of tabulated data.

FIG. 21 shows an exemplary histogram 2100 of the Lab values of tabulated data for several grains 2110*a-n*.

Figure 22:
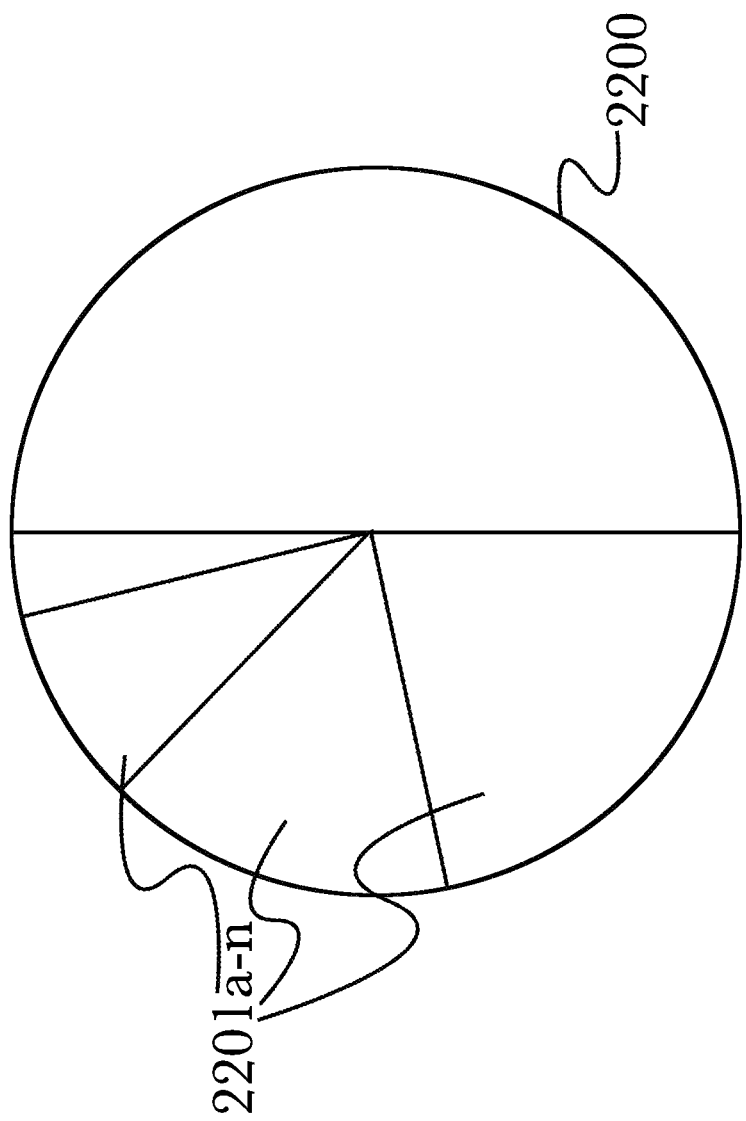
FIG. 22 shows data for a grain.

FIG. 22 shows exemplary color data for a single grain, showing a pie chart 2200 indicating portions of color variance 2201*a-n* in the grain surface.

FIG. 23 shows an exemplary certificate of analysis 2300. Most of the transactions in the supply chain include a quality test before shipment and incoming inspection by the receiving party. Currently, the reports are based on collective inputs including manual inspection results. The system will generate a certificate with images and digital absolute values measured by instruments. This will ensure accurate and objective reporting and reduce arguments, conflicts, and shipment returns based on subjective interpretation. The application uses the cloud databased with the test results, and uses templates to extract the desired text and images to include in the report.

Figure 24:
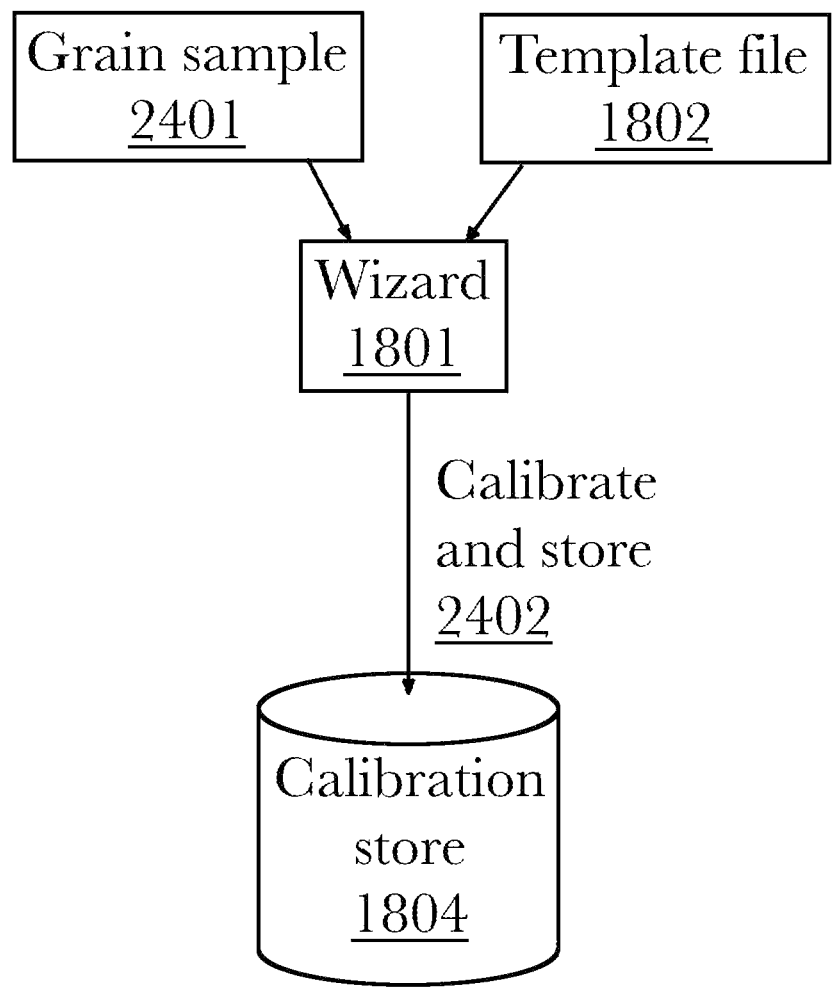
FIG. 24 shows the workflow of the software wizard of FIG. 18.

FIG. 24 shows an exemplary workflow of the software wizard of FIG. 18. Wizard 1801 loads a template file 1802 and grain sample 2401, calibrates using the loaded data 2402, and then stores the calibration 1804.

Figure 25:
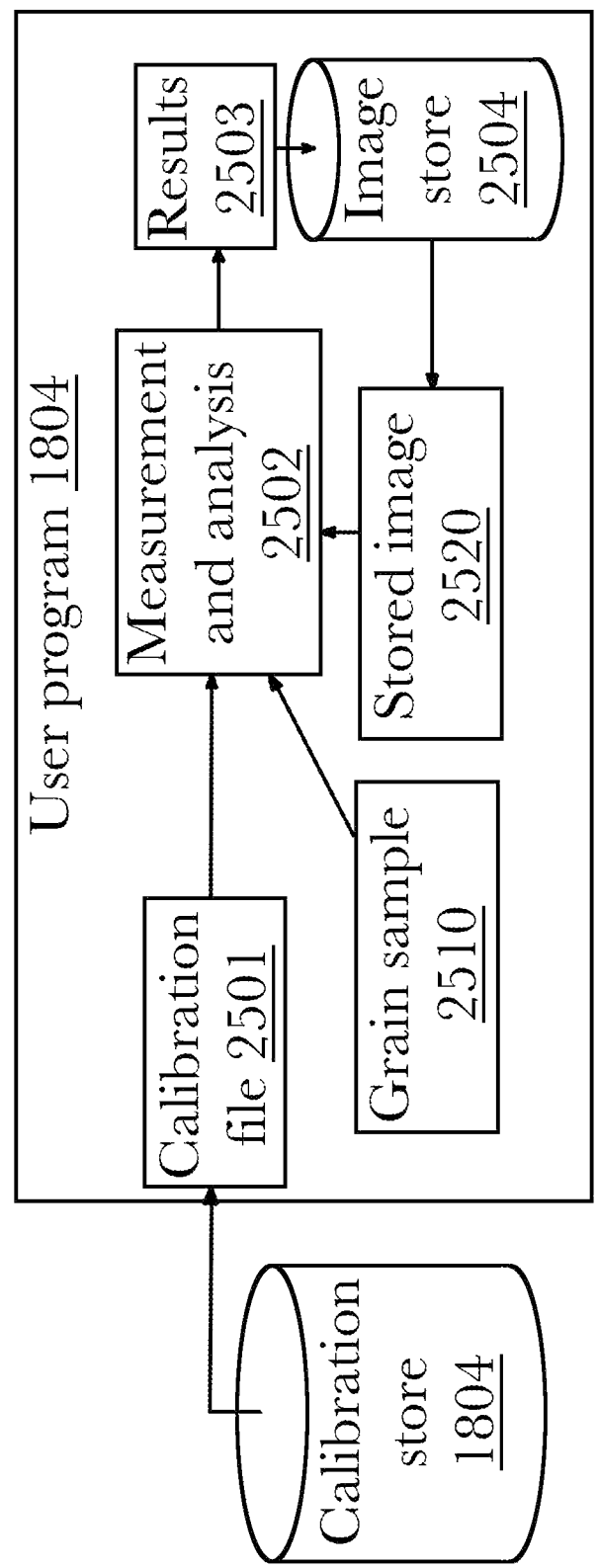
FIG. 25 shows the workflow of the user program of FIG. 18.

FIG. 25 shows an exemplary workflow of the user program of FIG. 18. User program 1804 retrieves a calibration file 2501 from a calibration store 1803, and uses the calibration when measuring and analyzing 2502 a grain sample 2510 or loaded historical grain sample imagery 2520. Calibrated measurement results 2503 may then be stored 2504 for future use, such as for loading and using in future operations 2520.

Figure 26:
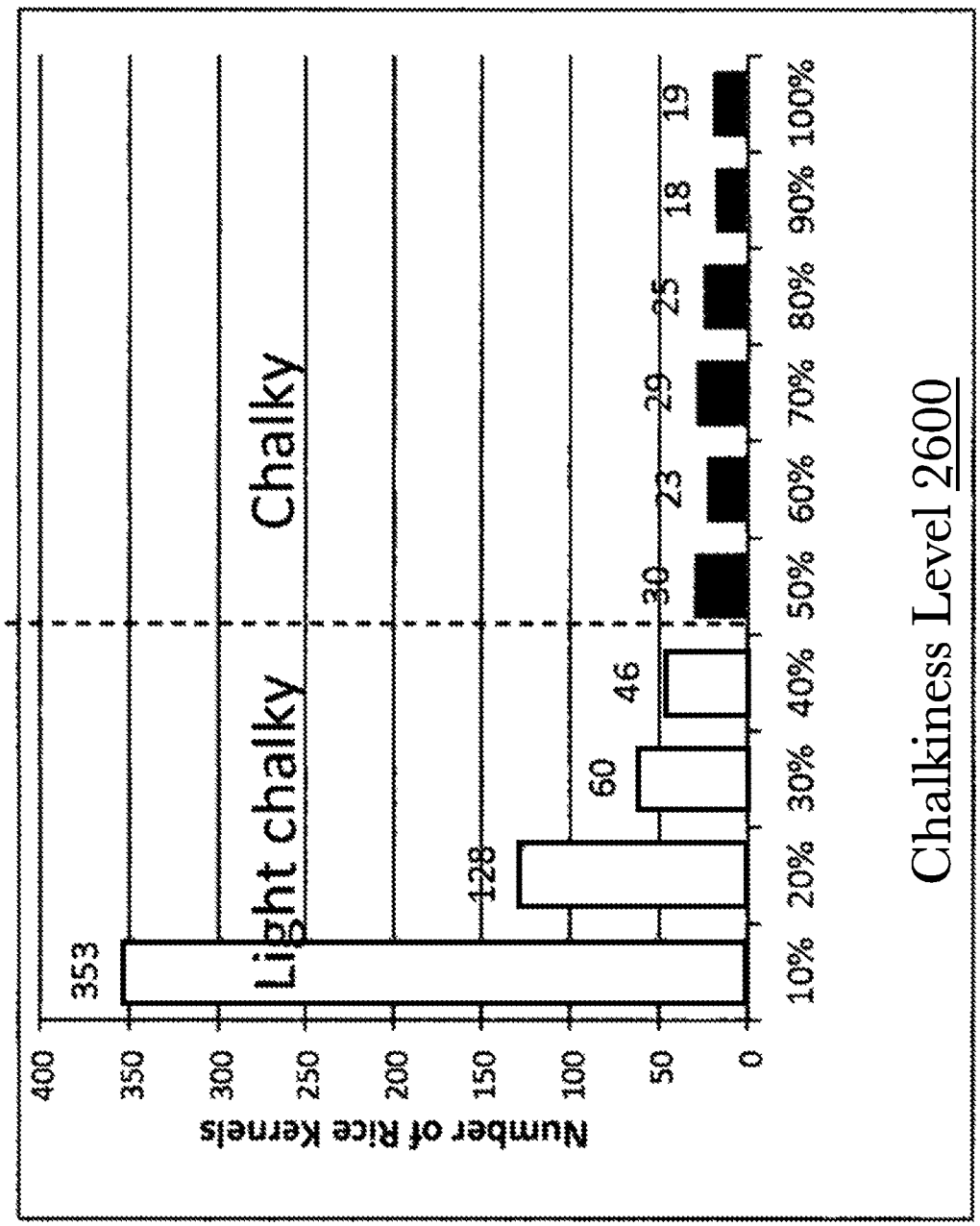
FIG. 26 shows the chalky distribution graph and values.

FIG. 26 shows an exemplary chalky distribution graph and values. The current graph 2600 shows that the distribution is not linear, and addresses the binary method provided by USDA and other standards. Chalk is an opaque area in the rice grain that occurs most commonly when grains are exposed to high temperatures during development. Chalky rice decreases the value of rice because of its undesirable appearance and quality Chalky rice grains are defined by USDA (for example) if more than 50% of the area of the grain is opaque in color. This method provides a subjective and biased presentation of the actual grain quality. For example, a grain can be 45% chalky and yet defined as "not chalky", or between 51-100% and defined as "chalky". It is a binary classification with no additional information that provides accurate status of the entire sample The wizard defines a level of color range that is defined as "chalky" using absolute color values and definitions of "light chalky" and "chalky" area of the total area of the grain and later in the user program with the measurement, classification, visualization, and reporting of the two values, in addition to the presentation of the entire sample distribution chart.

An alert system (not shown) will detect and notify selected users and will perform actions when triggered. User screen sets alert thresholds, for example if the amount of broken grains is higher than 5% or if the level of chalkiness is higher than 20%. Alerts may be via email, voice notification, SMS, or any other electronic communication method with relevant people or systems. A list of alerts is configured by the user and the cloud application monitor it periodically and compares with the test results of the sample. The alert system may notify in different locations of activity, incoming inspection to alert on bad grains in a shipment, processing for quality results, after storage, or before packing. This tool is valuable to improving overall food safety, quality, and operational efficiency.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 10:
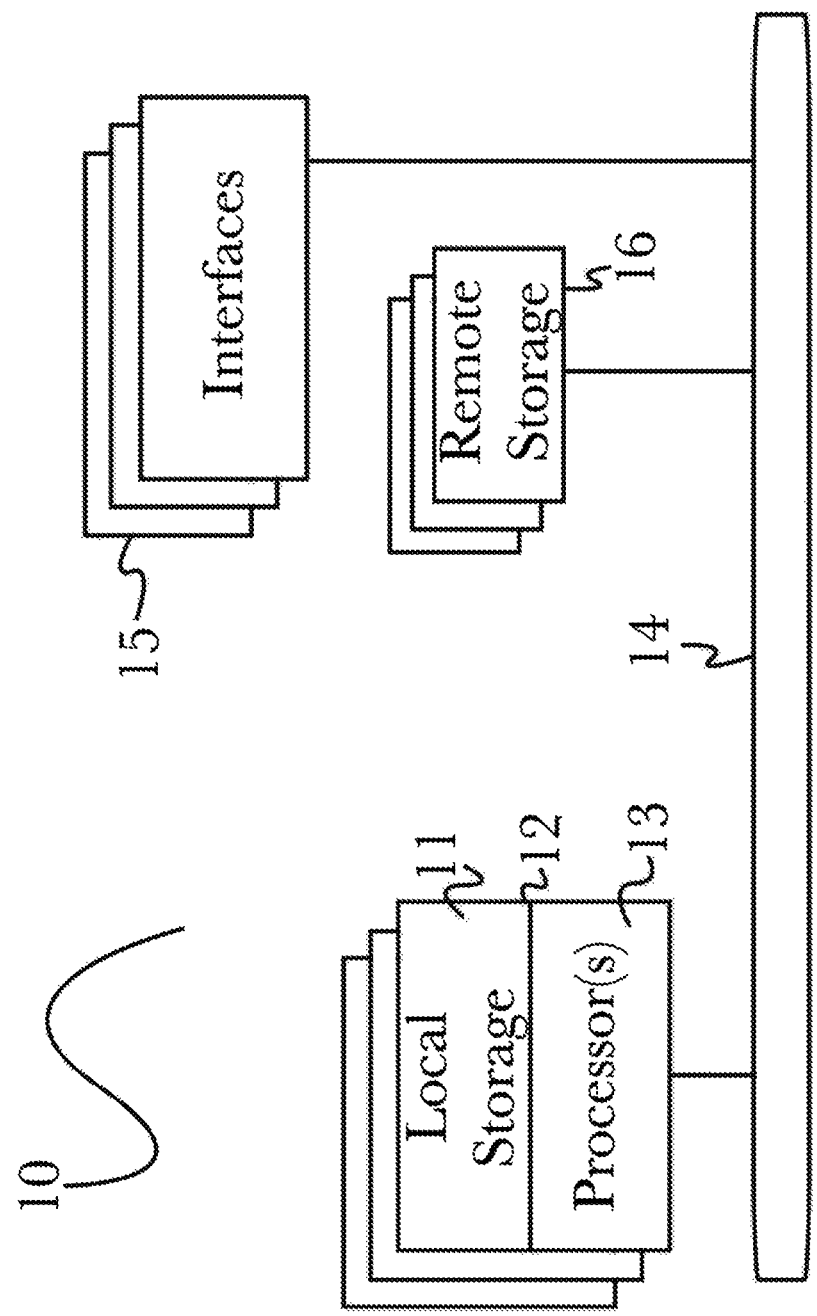
FIG. 10 is a block diagram illustrating an exemplary hardware architecture of a computing device.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
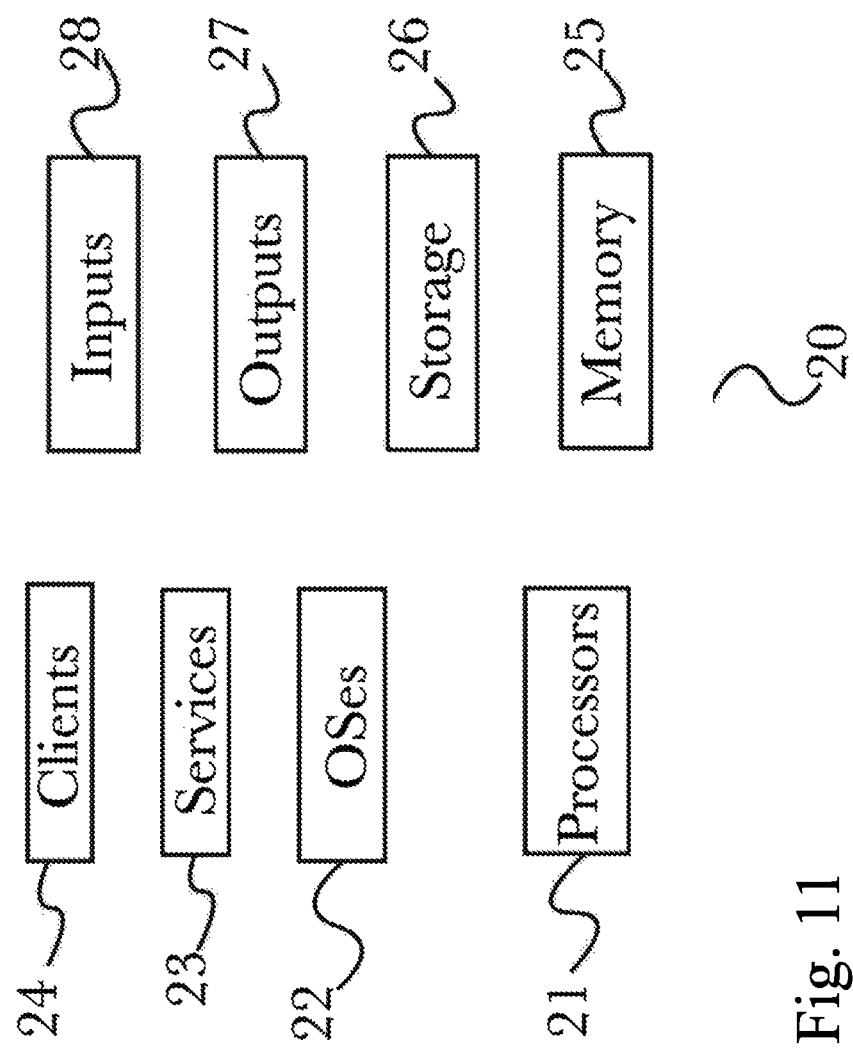
FIG. 11 is a block diagram illustrating an exemplary logical architecture for a client device.

In some aspects, systems may be implemented on a standalone computing system. Referring now to FIG. 11, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
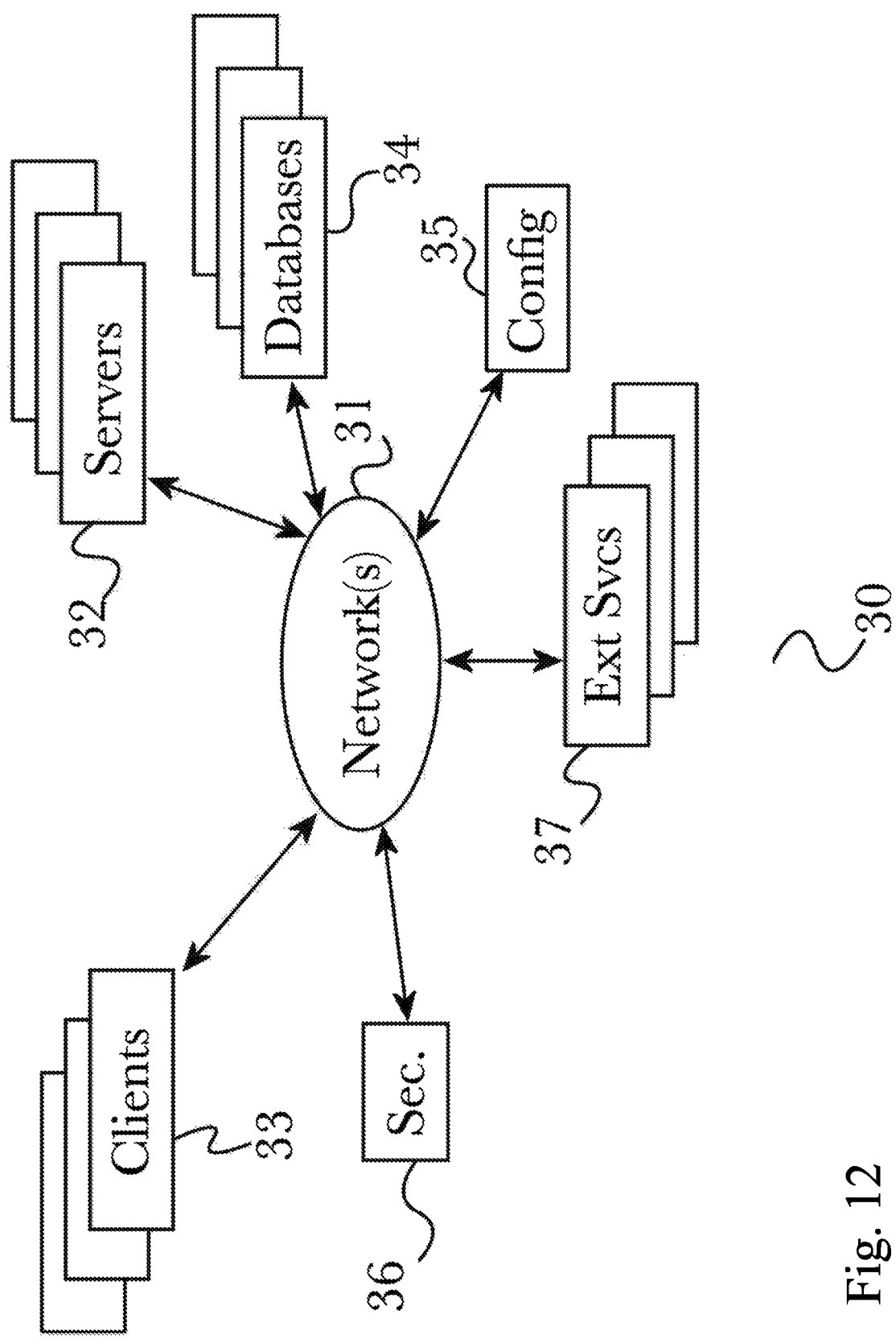
FIG. 12 is a block diagram showing an exemplary architectural arrangement of clients, servers, and external services.

In some aspects, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 13:
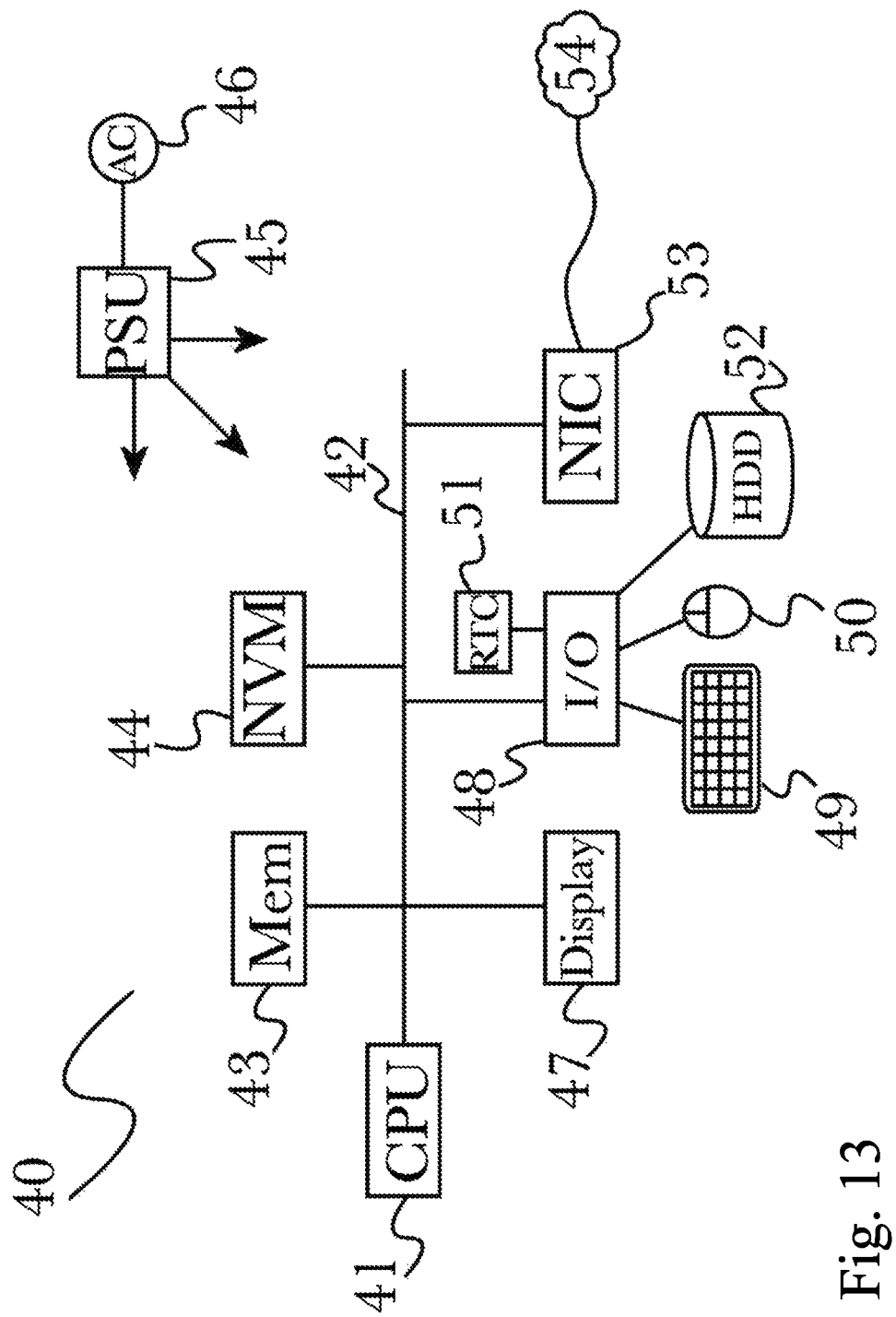
FIG. 13 is another block diagram illustrating an exemplary hardware architecture of a computing device.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for automated food safety analysis, quality analysis, and grading of grains, comprising:
an image processor, comprising a plurality of programming instructions stored in a memory of, and operating on a processor of, a computing device, wherein the plurality of programming instructions, when operating on the processor, cause the computing device to:
receive a digital image of grains;
identify and count within the digital image areas associated with individual grains;
extract dimension information for each individual grain identified;
create, for each individual grain identified, a pixel map of color data for each pixel within the area of the digital image associated with that individual grain; and
transmit or store data comprising individual grain count, the dimension information, and the pixel map for each individual grain for analysis;
a food safety analyzer and a quality analyzer, each comprising a plurality of programming instructions stored in the memory of, and operating on the processor of, the computing device, wherein the plurality of programming instructions, when operating on the processor, cause the computing device to:
receive or obtain the data from the image processor for a sufficient number of images from a single lot of grain to constitute a statistically representative sample for the lot of grain;
compare each pixel map in the data against pixel maps from reference images of sound and unsound grains of a type being inspected;
perform a food safety analysis and quality analysis, based on the pixel map comparisons, comprising a type and extent of unsoundness for each individual grain and a percentage of unsound grains in the data for the statistically representative sample; and
compare a result of the food safety analysis against at least one pre-defined standard for assessing food safety and a result of the quality analysis against at least one pre-defined standard for assessing grain quality; and
provide certificates of analysis for the lot of grain detailing an extent to which the lot of grain meets the at least one pre-defined standard for assessing food safety and the at least one pre-defined standard for assessing grain quality; and
a chalkiness analyzer comprising a plurality of programming instructions stored in the memory of, and operating on the processor of, the computing device, wherein the plurality of programming instructions, when operating on the processor, cause the computing device to:
receive or obtain the data from the image processor for a sufficient number of images from a single lot of grain to constitute a statistically representative sample for the lot of grain;
compare each pixel map in the data against pixel maps from reference images of chalkiness of grain of the type being inspected;

perform a chalkiness analysis, based on the pixel map comparisons, comprising at least a type and extent of chalkiness for each individual grain and a percentage of chalkiness of grains in the data for the statistically representative sample; and compare results of the chalkiness analysis against at least one industry standard for assessing chalkiness; and provide a certificate of analysis for the lot of grain detailing an extent to which the lot of grain meets the at least one industry standard for assessing chalkiness.

2. The system of claim 1, wherein bin-wise processing is used to improve a speed of the pixel map comparisons.

3. The system of claim 1, wherein data from the certificate of analysis is used to automatically control grain processing systems or equipment.

4. A method for automated food safety analysis, quality analysis, and grading of grains, comprising the steps of:

receiving, at an image processor, comprising a plurality of programming instructions stored in a memory of, and operating on a processor of, a computing device, a digital image of grains;

identifying and counting within the digital image areas associated with individual grains;

extracting dimension information for each individual grain identified;

creating, for each individual grain identified, a pixel map of color data for each pixel within the area of the digital image associated with that individual grain;

transmitting or storing data comprising individual grain count, the dimension information, and the pixel map for each individual grain for analysis;

receiving or obtaining, at both a food safety analyzer and a quality analyzer, each comprising a plurality of programming instructions stored in the memory of, and operating on a processor of, the computing device, the data from the image processor for a sufficient number of images from a single lot of grain to constitute a statistically representative sample for the lot of grain;

comparing each pixel map in the data against pixel maps from reference images of sound and unsound grains of a type being inspected;

performing a food safety analysis and quality analysis, based on the pixel map comparisons, comprising a type and extent of unsoundness for each individual grain and a percentage of unsound grains in the data for the statistically representative sample;

comparing a result of the food safety analysis against at least one pre-defined standard for assessing food safety, and comparing a result of the quality analysis against at least one pre-defined standard for assessing grain quality;

providing certificates of analysis for the lot of grain detailing an extent to which the lot of grain meets the at least one pre-defined standard for assessing food safety and the at least one pre-defined standard for assessing grain quality;

receiving or obtaining, at a chalkiness analyzer comprising a plurality of programming instructions stored in the memory of and operating on the processor of, the computing device, the data from the image processor for a sufficient number of images from a single lot of grain to constitute a statistically representative sample for the lot of grain;

comparing each pixel map in the data against pixel maps from reference images of chalkiness of grain of the type being inspected;

performing a chalkiness analysis, based on the pixel map comparisons, comprising at least a type and extent of chalkiness for each individual grain and a percentage of chalkiness of grains in the data for the statistically representative sample; and comparing results of the chalkiness analysis against at least one industry standard for assessing chalkiness; and providing a certificate of analysis for the lot of grain detailing an extent to which the lot of grain meets the at least one industry standard for assessing chalkiness.

5. The method of claim 4, wherein bin-wise processing is used to improve a speed of the pixel map comparisons.

6. The method of claim 4, wherein data from the certificate of analysis is used to automatically control grain processing systems or equipment.

* * * * *